(12) United States Patent
Stebbins et al.

(10) Patent No.: US 7,850,122 B2
(45) Date of Patent: Dec. 14, 2010

(54) COMPLIANCE MECHANISM

(75) Inventors: Robin William Stebbins, Snohomish, WA (US); Brad Alan Kauffman, Tulalip, WA (US); Kurt Randall Kraft, Seattle, WA (US); Craig Alan Vyeson, Everett, WA (US)

(73) Assignee: The Boeing Company, Chicago, IL (US)

( * ) Notice: Subject to any disclaimer, the term of this patent is extended or adjusted under 35 U.S.C. 154(b) by 426 days.

(21) Appl. No.: 11/956,942

(22) Filed: Dec. 14, 2007

(65) Prior Publication Data

US 2009/0155038 A1 Jun. 18, 2009

(51) Int. Cl.
*B64C 1/22* (2006.01)

(52) U.S. Cl. .............. 244/137.1; 244/110 E; 244/110 R

(58) Field of Classification Search .......... 244/110 E, 244/110 R, 116, 137.1; 280/6.15, 6.151, 280/6.153, 6.159, 6.16, 47.34, 47.35, 79.11, 280/79.3, 763.1–766.1; 180/904
See application file for complete search history.

(56) References Cited

U.S. PATENT DOCUMENTS

| | | | | |
|---|---|---|---|---|
| 1,637,789 | A | * | 8/1927 | Schnitzer .................. 244/116 |
| 2,362,991 | A | * | 11/1944 | Dahl ......................... 414/427 |
| 2,867,451 | A | * | 1/1959 | Repke ..................... 280/479.1 |
| 2,977,077 | A | | 3/1961 | Pearson |
| 3,043,410 | A | | 7/1962 | Pearson |
| 3,051,419 | A | | 8/1962 | Weiland et al. |
| 3,150,849 | A | * | 9/1964 | Conway ................. 244/100 R |
| 3,653,615 | A | | 4/1972 | Spence |
| 4,421,286 | A | * | 12/1983 | Laky et al. ................. 244/116 |
| 4,518,304 | A | * | 5/1985 | Blatchford ................. 414/542 |
| 5,820,077 | A | | 10/1998 | Sutliff et al. |
| 6,039,287 | A | | 3/2000 | Liston et al. |
| 7,445,180 | B2 | * | 11/2008 | Plude et al. .............. 244/118.1 |
| 7,503,523 | B2 | | 3/2009 | Perez-Sanchez |
| 7,631,837 | B2 | * | 12/2009 | Becker et al. ............... 244/109 |

(Continued)

FOREIGN PATENT DOCUMENTS

AU 1999057818 A1 1/1991

(Continued)

OTHER PUBLICATIONS

PCT Search and Written Opinion for PCT/US2008/072933 dated Sep. 30, 2009.

(Continued)

*Primary Examiner*—Timothy D Collins
*Assistant Examiner*—Justin Benedik
(74) *Attorney, Agent, or Firm*—Yee & Associates, P.C.; Brett L. Halperin

(57) ABSTRACT

A method and apparatus for a mobile tail support vehicle moving a swing tail cargo door of a swing tail aircraft. A mobile tail support apparatus is engaged to the swing tail cargo door on the swing tail aircraft. The swing tail cargo door is moved from a first position to a second position using the mobile tail support apparatus. Vertical reaction occurs to vertical loads on the swing tail cargo door during movement of the swing tail aircraft by the mobile tail support apparatus. Loads on a hinge and/or swing tail cargo door are reduced during the movement of the swing tail cargo door using the mobile tail support apparatus.

10 Claims, 14 Drawing Sheets

U.S. PATENT DOCUMENTS

2009/0045288 A1  2/2009  Nakamura et al.
2009/0157235 A1  6/2009  Stebbins et al.

FOREIGN PATENT DOCUMENTS

EP  0743240 A  11/1996
GB  737163 A  9/1955

OTHER PUBLICATIONS

U.S. Appl. No. 11/956,956, filed Dec. 14, 2007, Stebbins et al.
U.S. Appl. No. 11/589,623, filed Oct. 30, 2006, DiEsposti et al.
U.S. Appl. No. 11/541,849, filed Oct. 2, 2006, Plude et al.
U.S. Appl. No. 11/840,677, filed Aug. 17, 2007, Nakamura et al.

* cited by examiner

COMPLIANCE MECHANISM

BACKGROUND INFORMATION

1. Field

The present disclosure relates generally to an improved aircraft and in particular to a swing tail cargo door on an aircraft. Still more particularly, the present disclosure relates to a method and apparatus for moving a swing tail cargo door on an aircraft.

2. Background

A swing tail aircraft may be an aircraft in which the tail portion of the aircraft may be moveably mounted to allow the tail portion to swing or move to expose the inner portion of the aircraft. This tail may also be referred to as a swing tail cargo door.

With the use of the swing tail cargo door, larger cargo, such as, without limitation, vehicles, fuselage sections, or wings, may be placed into and moved out of an aircraft. This type of cargo may be loaded and unloaded from the back of the aircraft with the swing tail in an open position. In this manner, much larger parts may be placed into the aircraft in comparison to other types of cargo doors.

With large cargo aircraft, the weight of the swing tail cargo door may require aircraft personnel to use equipment to lift or support the swing tail cargo door during movement, loading operations, and unloading operations or repositioning of the swing tail cargo door. These types of processes may be manually intensive requiring equipment and personnel to move and align the swing tail cargo door during repositioning or the opening or closing of a swing tail cargo door.

Currently used systems, however, may not allow for quick closure especially in high wind conditions. Additionally, currently used techniques and equipment may place unnecessary stress on the swing tail cargo door during movement or loading operations and unloading operations of the swing tail cargo door. Currently used techniques also may add weight to the aircraft if a door control/support mechanism/system is built into the plane.

Accordingly, there is a need for a method and apparatus for repositioning a swing tail cargo door, which overcomes the problems discussed above.

SUMMARY

The advantageous embodiments provide a method and apparatus for a mobile tail support vehicle. The mobile tail support vehicle moves a swing tail cargo door of a swing tail aircraft. The mobile tail support vehicle comprises a vertical support system, a horizontal support system, a lock plate, and a vehicle. The vertical support system is capable of controlling a vertical load of the swing tail cargo door of the swing tail aircraft, wherein vertical support system includes an accumulator unit capable of providing substantially constant vertical loading support during opening, cargo loading operations, cargo unloading operations, or closing of the swing tail cargo door and a lift structure capable of moving a coupling mechanism vertically to couple to the swing tail cargo door. The horizontal support system is capable of isolating horizontal and rotational motions of the swing tail cargo door to prevent an unacceptable load from occurring on the swing tail cargo door during movement of the swing tail cargo door around an axis through a hinge of the swing tail cargo door, wherein horizontal support system includes a cross track slide system capable of isolating the motions of the swing tail cargo door to prevent the unacceptable load transfer from occurring on the swing tail or the hinge of the swing tail cargo door during the movement of the swing tail cargo door around the axis through the hinge of the swing tail cargo door and the coupling mechanism capable of engaging the swing tail cargo door, wherein radial movement of the swing tail cargo door occurs along a radial axis through the coupling mechanism. The lock plate is capable of locking the coupling mechanism in a coupled state with the swing tail cargo door. The vertical support system and the horizontal support system are mounted on the vehicle. The moves with the coupling mechanism coupled to the swing tail cargo door to move the swing tail cargo door from one position to another position.

In another advantageous embodiment, a method is provided for moving a swing tail cargo door on a swing tail aircraft. A mobile tail support apparatus is engaged to the swing tail cargo door on the swing tail aircraft by coupling a ball fitting in the mobile tail support apparatus to the swing tail cargo door and locking the ball fitting to the swing tail cargo door in a coupled position. The swing tail cargo door is moved from a first position to a second position using the mobile tail support apparatus. Vertical loads on the swing tail cargo door are reacted to during movement of the swing tail aircraft using a support system capable of controlling a vertical load of the swing tail cargo door of the swing tail aircraft during the movement of the swing tail cargo door. Loads are reduced on a hinge of the swing tail cargo door during the movement of the swing tail cargo door using a second support system capable of isolating motions of the swing tail cargo door to prevent an unacceptable load from occurring on the swing tail or hinge of the swing tail cargo door during the movement of the swing tail cargo door around an axis through the hinge of the swing tail cargo door.

In yet another embodiment, the mobile tail support vehicle comprises a mobile support base, a vertical support system, a horizontal support system, and a coupling mechanism. The vertical support system has an accumulator unit capable of controlling a vertical load of swing tail cargo door of a swing tail aircraft. The horizontal support system is capable of isolating horizontal and rotational motions of the swing tail cargo door to prevent an unacceptable load from occurring on a swing tail or hinge of the swing tail cargo door during movement of the swing tail cargo door around an axis through the hinge of the swing tail cargo door. The coupling mechanism is mounted on the horizontal support system and is capable of coupling to the swing tail cargo door.

In another advantageous embodiment, a mobile tail support apparatus comprises a first support system and a second support system. The first support system is capable of controlling a vertical load of swing tail cargo door of a swing tail aircraft. The second support system is capable of isolating motions of the swing tail cargo door to prevent an unacceptable load from occurring on a swing tail or hinge of the swing tail cargo door during movement of the swing tail cargo door around an axis through the hinge of the swing tail cargo door.

In still yet another advantageous embodiment, a method for moving a swing tail cargo door on a swing tail aircraft is provided. A mobile tail support apparatus is engaged to the swing tail cargo door on the swing tail aircraft. The swing tail cargo door is moved from a first position to a second position using the mobile tail support apparatus. The method reacts vertically to vertical loads on the swing tail cargo door during movement of the swing tail aircraft and reduces loads on a hinge of the swing tail cargo door during movement of the swing tail cargo door.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
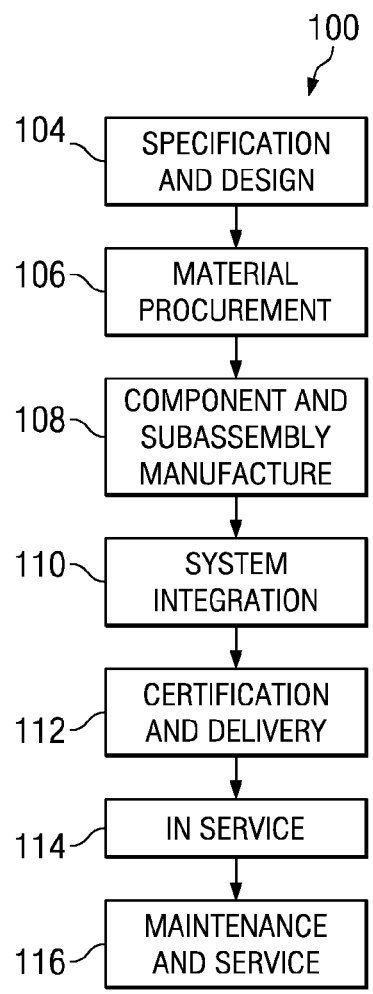
FIG. 1 is a flow diagram of aircraft production and service methodology in which an advantageous embodiment may be implemented.
Figure 2:
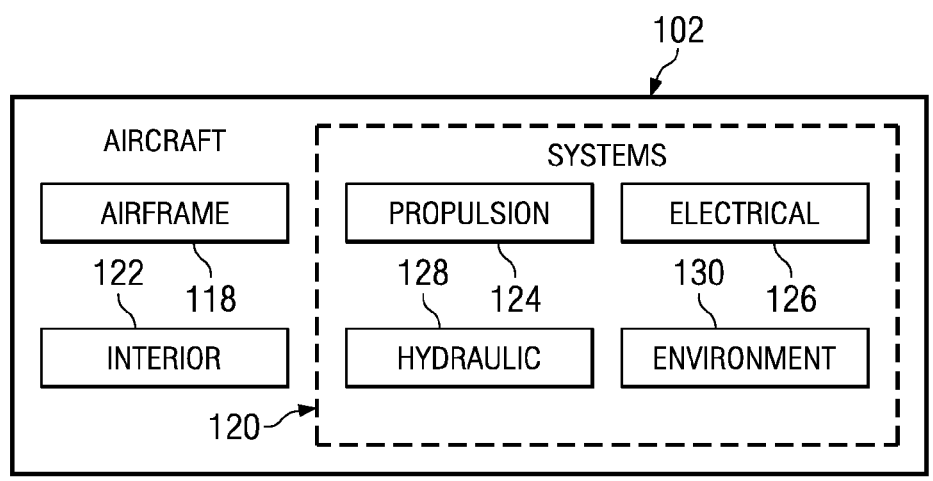
FIG. 2 is a block diagram of an aircraft in accordance with an advantageous embodiment.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
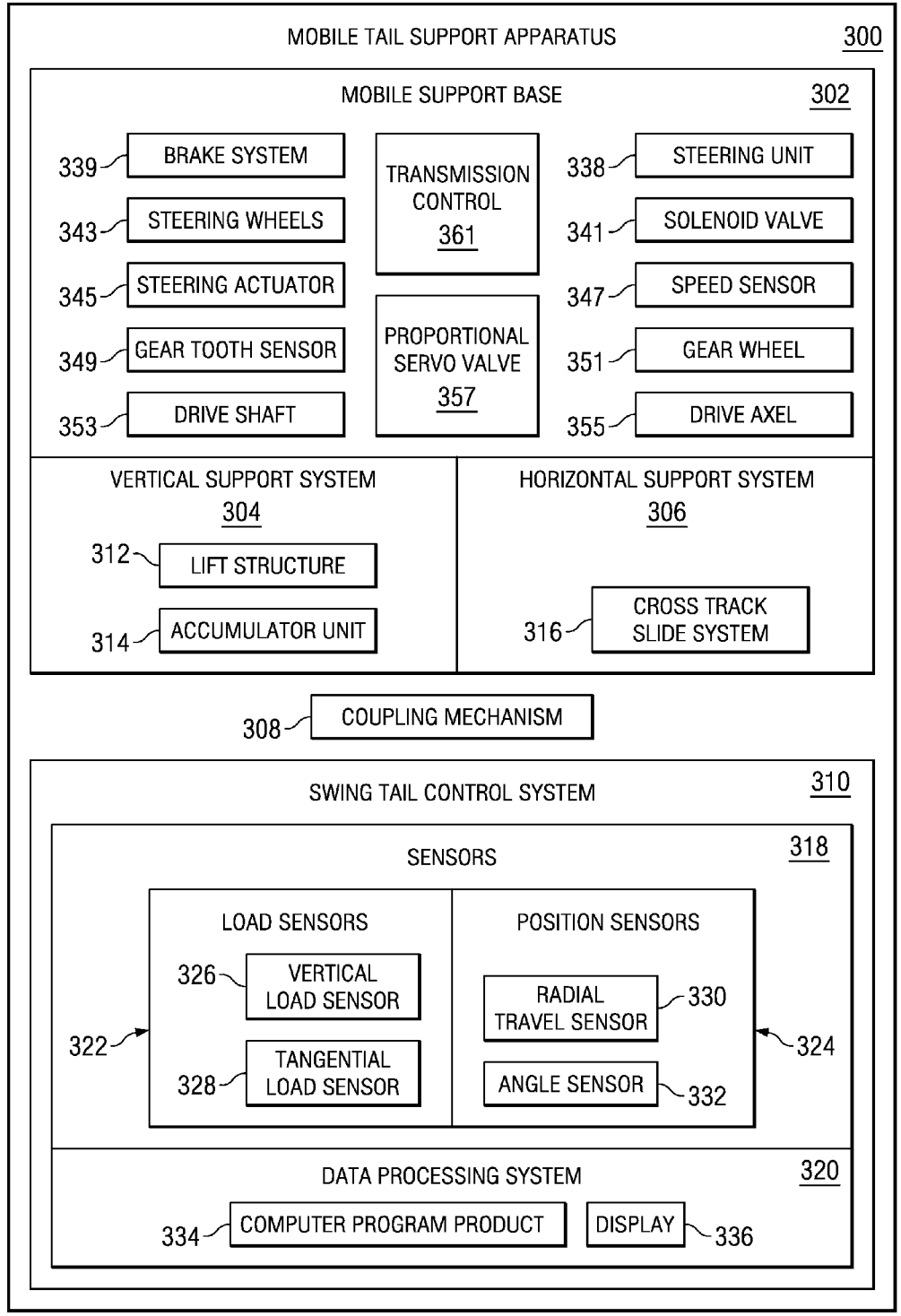
FIG. 3 is an illustration of a functional block diagram of a mobile tail support apparatus for moving a swing tail cargo door on a swing tail aircraft in accordance with an advantageous embodiment.

With reference now to FIG. 3, an illustration of a functional block diagram of a mobile tail support apparatus for moving a swing tail cargo door on a swing tail aircraft is depicted in accordance with an advantageous embodiment. In this example, mobile tail support apparatus 300 includes mobile support base 302, vertical support system 304, horizontal support system 306, coupling mechanism 308, and swing tail control system 310. Vertical support system 304 includes lift structure 312 and accumulator unit 314. Horizontal support system 306 includes cross track slide system 316.

Swing tail control system 310 includes sensors 318 and data processing system 320. Sensors 318 include load sensors 322 and position sensors 324. Load sensors 322 include vertical load sensor 326 and tangential load sensor 328. Position sensors 324 include radial travel sensor 330 and angle sensor 332. In these examples, load sensors 322 and position sensors 324 may each be a set of sensors. Also, vertical load sensor 326, tangential load sensor 328, radial travel sensor 330, and angle sensor 332 may be a set of sensors. A set as used herein refers to one or more items. For example, a set of load sensors may be one or more sensors.

Mobile support base 302 may take the form of a vehicle with wheels for moving mobile tail support apparatus 300. Vertical support system 304 may be capable of controlling a vertical load of a swing tail cargo door of a swing tail aircraft. Accumulator unit 314 may be a hydraulic and gas system that provides lift and/or a shock absorber functionality to reduce and/or minimize the vertical movement of the swing tail cargo door in addition to supporting the swing tail cargo door.

Lift structure 312 may move coupling mechanism 308 into place with respect to the swing tail cargo door for coupling. Lift structure 312 in combination with accumulator unit 314 may provide vertical support for the swing tail cargo door when coupling mechanism 308 is coupled to the swing tail cargo door.

Horizontal support system 306 employs cross track slide system 316 to prevent an unacceptable load from occurring on a swing tail cargo door or hinge of the swing tail cargo door during movement of the swing tail cargo door around an axis through the hinge of the swing tail cargo door. Loads that occur on the swing tail cargo door may translate into loads on the hinge or other parts of the swing tail aircraft. For example, cross track slide system 316 may eliminate, minimize or reduce the radial displacement of the mobile support base 302 in relation to the coupling mechanism 308 as mobile support base 302 moves to change the position of the swing tail cargo door.

In these examples, swing tail control system 310 provides guidance or management of the movement of mobile tail support apparatus 300 during repositioning of a swing tail cargo door. Vertical load sensor 326 detects the vertical load of the swing tail cargo door on mobile tail support apparatus 300 when coupling mechanism 308 is coupled to or engaged with the swing tail cargo door. Tangential load sensor 328 detects tangential loads on coupling mechanism 308 of the swing tail cargo door.

In these examples, a tangential load may be a load perpendicular to a line drawn in a horizontal plane from coupling mechanism 308 through the hinge line of the swing tail cargo door. Radial travel sensor 330 identifies the amount of change in the travel of mobile tail support apparatus 300 from the hinge of the swing tail cargo door giving a radial displacement value. In these examples, the coupling radius may be the distance of coupling mechanism 308 from the hinge of the swing tail cargo door. Radial displacement is the amount of radial displacement the ball fitting makes from it's nominal position with respect to the mobile tail support apparatus.

Angle sensor 332 detects an angle of mobile tail support apparatus 300 relative to the swing tail cargo door when mobile tail support apparatus 300 is coupled to the swing tail cargo door. In these examples, this angle may be an angle between the centerline of the chassis for mobile support base 302 relative to a radial line from coupling mechanism 308 to the hinge of the swing tail cargo door. In these examples, angle sensor 332 may be a sensor located at coupling mechanism 308.

Data processing system 320 executes computer program product 334 to generate output to guide the movement of mobile tail support apparatus 300. In response to receiving the radial displacement and the angle of mobile tail support apparatus 300 from radial travel sensor 330 and angle sensor 332, data processing system 320 selectively generates guidance to change the movement of mobile tail support apparatus 300. This guidance may be used to manage or control the movement of mobile tail support apparatus 300. This guidance may be, for example, without limitation, steering signals displayed to an operator of mobile tail support apparatus 300 on display 336. The presentation of these steering signals may cause a selective change in the movement of mobile tail support apparatus 300.

The selective change in the movement of mobile tail support apparatus 300 may be performed by presenting directions or guidance to an operator of mobile tail support apparatus 300 through display 336. In other embodiments, data processing system 320 may generate guidance in a form of signals to steering unit 338 in mobile support base 302 to automatically change the movement of mobile tail support apparatus 300. These signals also may cause mobile support base 302 to halt movement by engaging a brake system 339 controlled by steering unit 338. Brake system 339 includes at least one brake that may be used to slow down and/or stop mobile support apparatus 300.

Figure 4:
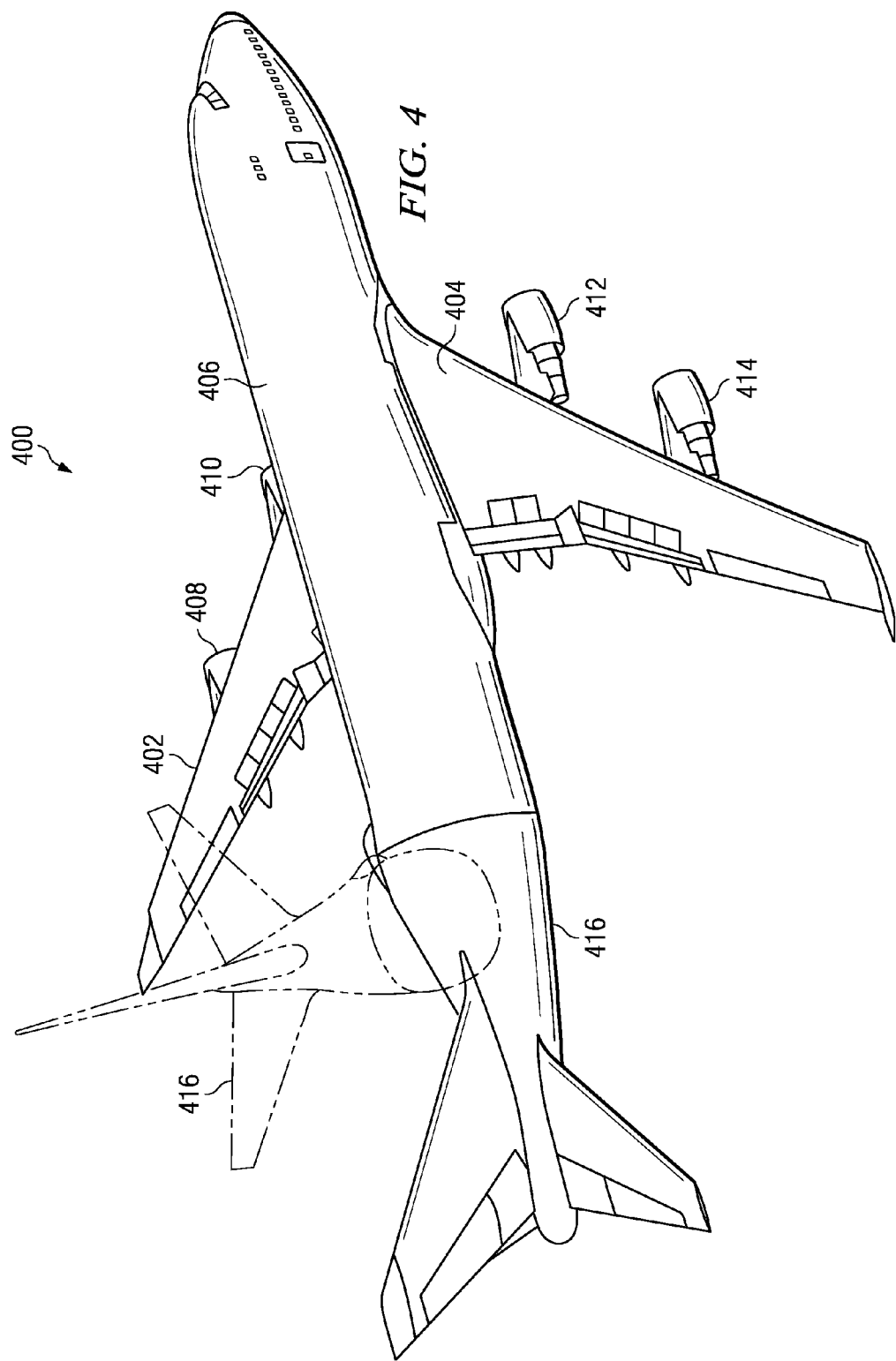
FIG. 4 is an illustration of an aircraft with a swing tail cargo door in accordance with an advantageous embodiment.

With reference now to FIG. 4, an illustration of an aircraft with a swing tail cargo door is depicted in accordance with an advantageous embodiment. In this example, aircraft 400 may have wings 402 and 404 attached to fuselage 406. Aircraft 400 also may include wing mounted engines 408, 410, 412, and 414.

Aircraft 400 also may have swing tail cargo door 416, shown in both a closed position and an open position. The open position is shown in phantom in this example. Swing tail cargo door 416 may move horizontally relative to the fuselage to change positions. Aircraft 400 may be considered to be in an operation configuration in the closed position, allowing aircraft 400 to fly. In these examples, aircraft 400 may be implemented as a large cargo aircraft for transporting different components, such as a fuselage and wings of an aircraft being manufactured.

Figure 5:
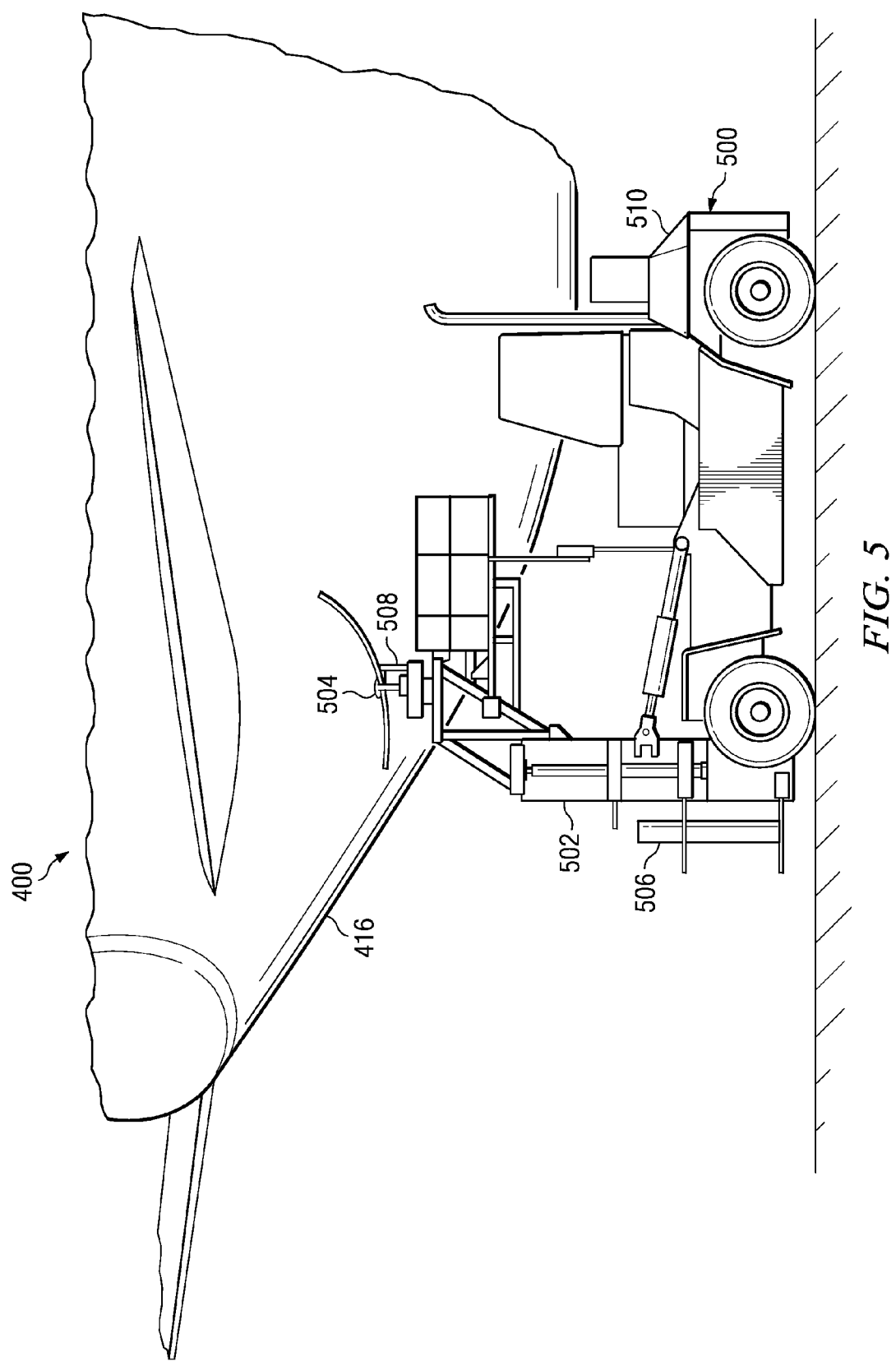
FIG. 5 is an illustration of an aircraft with a mobile tail support apparatus in accordance with an advantageous embodiment.

With reference now to FIG. 5, an illustration of an aircraft with a mobile tail support apparatus is depicted in accordance with an advantageous embodiment. In this example, swing tail cargo door 416 is depicted in a closed position on aircraft 400. Swing tail cargo door 416 may be opened and closed with assistance from mobile tail support apparatus 500. Mobile tail support apparatus 500 may be a vehicle having tool 502, which may be used to move swing tail cargo door 416.

Mobile tail support apparatus 500 may provide vertical support to swing tail cargo door 416 as swing tail cargo door 416 rotates from either an open to closed position or a closed to open position. Tool 502 may move vertically to engage swing tail cargo door 416 at socket 504 in aircraft 400 to open and close swing tail cargo door 416. With tool 502 engaged in socket 504, mobile tail support apparatus 500 may move swing tail cargo door 416 in an arc or path to open and close swing tail cargo door 416. Mobile tail support apparatus 500 may provide the force and support needed to open and close swing tail cargo door 416 without undesirable forces or stresses being applied to swing tail cargo door 416.

As depicted, tool 502 may include vertical support system 506 and horizontal support system 508. These components may be mounted on mobile support base 510. Mobile support base 510 is an example of mobile support base 302 in FIG. 3. Vertical support system 506 may be an example of vertical support system 304 in FIG. 3, while horizontal support system 508 may be an example of horizontal support system 306 in FIG. 3. More detailed illustrations and descriptions of these systems are provided below.

In these examples, mobile support base 510 may be implemented using any special purpose or standard chassis used for moving and/or lifting items. One example, without limitation, may be a chassis used for a forklift or some other suitable chassis. A lift truck chassis that may be used in the different advantageous embodiments may be, for example, without limitation, a Hyster-H 1050HD lift truck, which is available from Hyster Company.

Of course, any chassis suitable for mounting a tool, such as tool 502 for moving swing tail cargo door 416, may be used. In selecting a chassis for mobile support base 510, the chassis may have sufficient mass to react to various vertical and lateral loads that may be applied to mobile support base 510 when moving swing tail cargo door 416 in different positions. Further, another feature of a chassis may be to provide smooth and readily controllable slow speed operation, such as, for example, without limitation, 0.5 inches per second to 3.0 inches per second. Also, mobile support base 510 also may have mounting positions for vertical support system 506 and horizontal support system 508 as well as a location for a controller for these components.

Additionally, brake system 339 in mobile support base 510 may be, for example, without limitation, hydraulic brakes. Brake system 339 may be coupled to solenoid valve 341 to activate brake system 339 in parallel with a normal brake pedal. Further, mobile support base 510 also may provide a signal to identify the angle of steering wheels 343. This signal may be provided through a modification of mobile support base 510 to include a sensor to identify the angle of steering wheels 343.

A sensor may be added to the steering actuator 345 to supply the position of the wheels with respect to a centerline through mobile support base 510. Also, mobile support base 510 may provide or may be modified to include speed sensor 347 with a resolution within a desired speed range when moving swing tail cargo door 416. Further, mobile support base 510 also may provide an indication of direction of travel, such as, for example and without limitation, forward or reverse.

Gear tooth sensor 349 and gear wheel 351 may be added to drive shaft 353 at drive axle 355 to reliably and accurately sense the speed of mobile support base 510 during low speed operations. Proportional servo valve 357 may be added in parallel to brake system 339 to partially apply the brake system 339 during travel to control vehicle speed. Further, a signal may be obtained from the transmission control 361 to provide a direction of travel.

In this manner, mobile tail support apparatus 500 may prevent and/or reduce unacceptable loads from being applied to any part of aircraft 400. These loads may be loads that may occur with respect to swing tail cargo door 416 for aircraft 400. The loads on swing tail cargo door 416 may be placed on to the hinge and there through into other portions of aircraft 416. These loads may occur during movement, such as, for example, without limitation, opening and closing of swing tail cargo door 416. These loads also may occur during other operations, such as, for example, without limitation, loading and/or unloading of cargo from aircraft 400.

Figure 6:
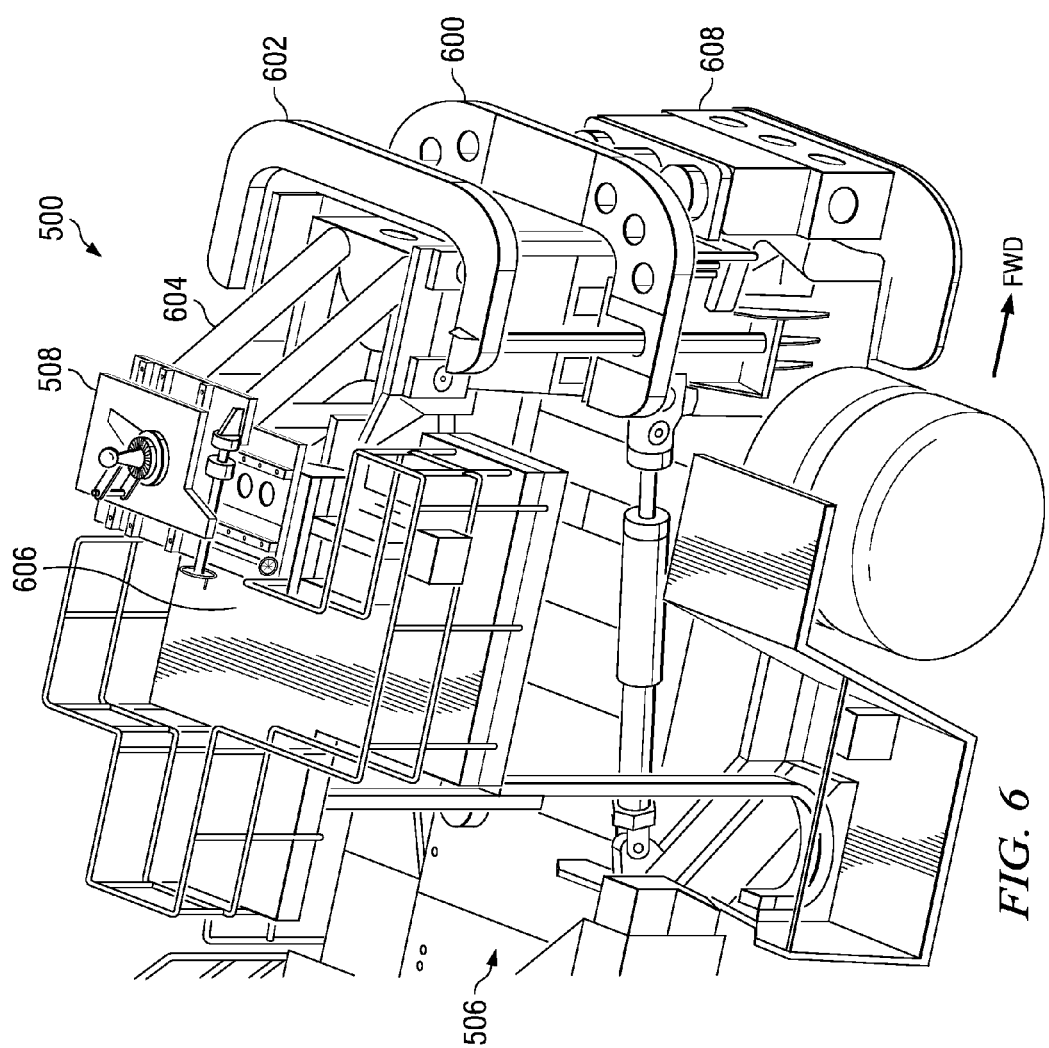
FIG. 6 is an illustration of components in a vertical support system in accordance with an advantageous embodiment.

FIGS. 6-9 provide more detailed illustrations of vertical support system 500 in FIG. 5. Turning now to FIG. 6, an illustration of components in a vertical support system is depicted in accordance with an advantageous embodiment. In this example, vertical support system 506 is shown in more detail in this perspective view of a portion of mobile tail support apparatus 500. As depicted, vertical support system 506 includes bottom lift structure 600, middle lift structure 602, and upper lift structure 604. Vertical support system 506 also includes balcony 606. Horizontal support system 508 may be mounted on upper lift structure 604 in these examples.

More detailed illustrations and descriptions of horizontal support system 508 may be found below with respect to FIGS. 11 and 12. Vertical support system 506 also includes accumulator tank unit 608. As illustrated, vertical support system 506 may provide smooth vertical extension with minimal resistance while maximizing horizontal stability.

Figure 7:
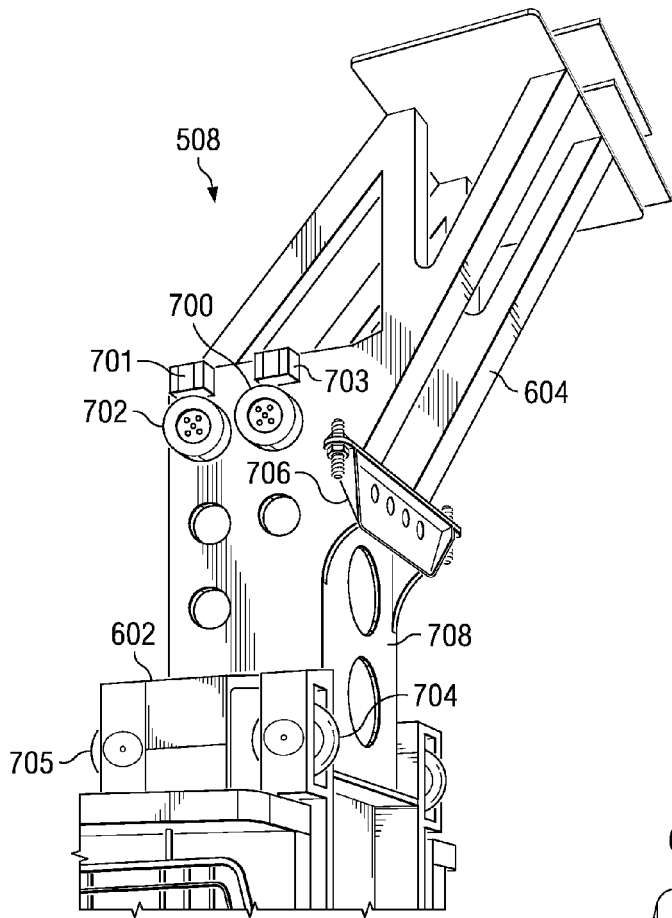
FIG. 7 is an illustration of lift structures in a vertical support system is depicted in accordance with an advantageous embodiment.

Turning now to FIG. 7, an illustration of lift structures in vertical support system is depicted in accordance with an advantageous embodiment. In this example, rollers 700, 701, 702 and 703 are shown. These rollers may be secured between middle lift structure 602 and upper lift structure 604. Roller 704 is shown. Another roller similar to roller 704 may be present behind cover 705. Roller 704 and the roller behind cover 705 allow the chains routed over these rollers to freely retract and extend in response to the lift structure mid section vertical movement. These rollers may rotate for a smoother extension with minimal resistance to the chain. The roller behind the cover 705 may be the same roller that attaches to chain 804 in FIG. 8.

Also, two additional small rollers, like rollers 701 and 703, and two additional large rollers, like rollers 700 and 702, may be present below the rollers 704 and behind cover 705 as well as on opposite side. Smaller rollers, such as rollers 700 and 702, may provide for smooth vertical lift operations. These operations may occur with minimum clearance and resistance between them and the surface the rollers react against with the tight lateral tolerances that may be required for smooth operations.

These rollers may rotate for a smoother extension with minimal resistance. Rollers 700 and 702, as well as the ones hidden behind cover 705 and roller 704 and on the opposite side may provide for smooth vertical lift operations to occur with minimum clearance and resistance between them and the surface they react against with the tight forward and/or aft tolerances that may be required for smooth operations.

Additionally, these rollers behave as the smaller ones, like rollers 701 and 703, mentioned above. Roller 704 and the roller hidden behind cover 705 may react to loads that may be considerably larger in the forward and/or aft direction. Although the particular configuration of rollers 700, 701, 702, 703, and 704 may provide for purposes of depicting one mechanism, smoother extension of upper lift structure 604, other types of mechanisms may be employed depending on the particular implementation.

Figure 8:
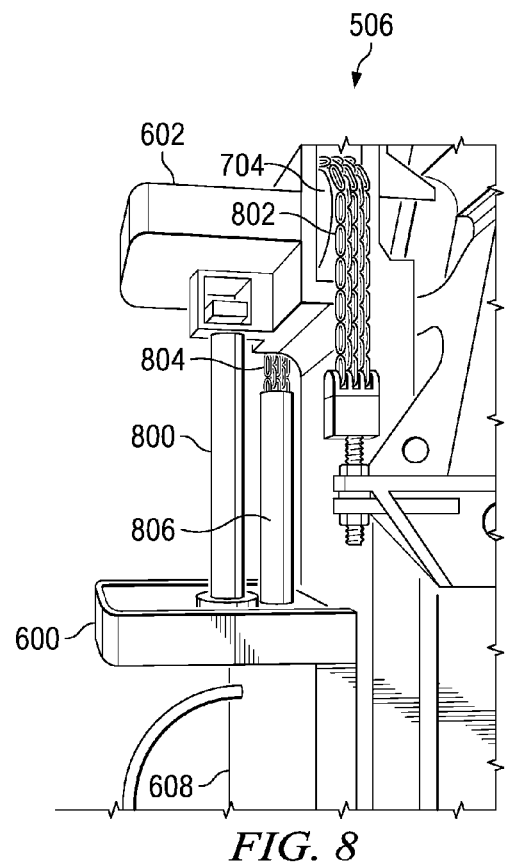
FIG. 8 is an illustration of lift mechanisms for a vertical support system in accordance with an advantageous embodiment.

With reference now to FIG. 8, an illustration of lift mechanisms for a vertical support system is depicted in accordance with an advantageous embodiment. In this example, lift cylinder 800, chain 802, and chain 804 are examples of mechanisms that may be used to provide lifting force for vertical support system 506.

Lift cylinder 800 may be used to provide lift for middle lift structure 602. Chain 802 and chain 804 may be used to provide lifting forces for upper lift structure 604, which is not shown in this view. Chain 802 may be laid over roller 704, while chain 804 may be laid over another roller that is not shown. Further, post 806 may be used to provide maintenance safety.

Figure 9:
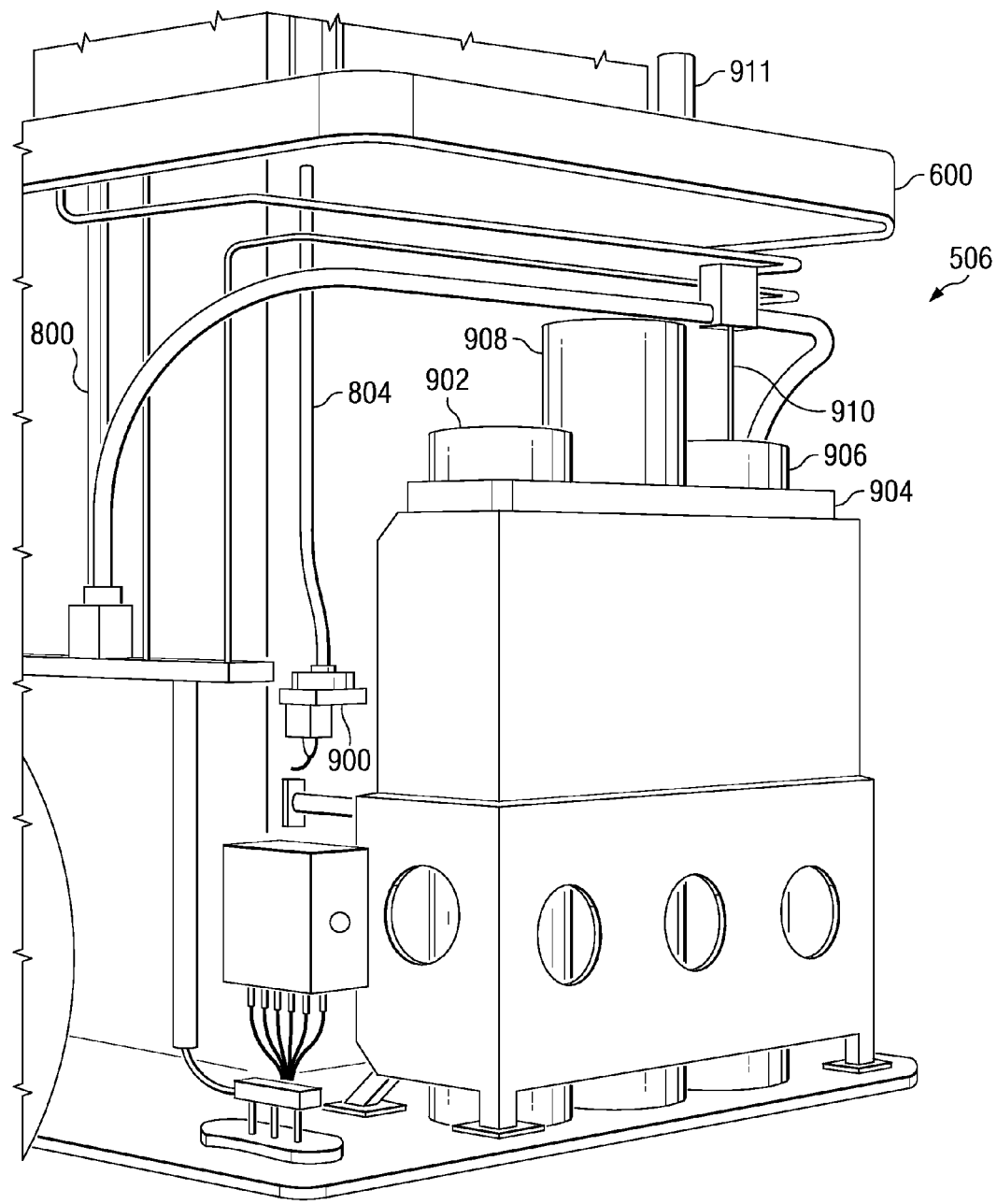
FIG. 9 is an illustration of a portion of a vertical support system in accordance with an advantageous embodiment.

With reference next to FIG. 9, an illustration of a portion of a vertical support system is depicted in accordance with an advantageous embodiment. In this example, the vertical load may be monitored using load cell monitor 900. Load cell monitor 900 may be mounted at the fixed end of chain 804. Another load cell and chain also may be present on the opposite side at the fixed end of chain 802. Further, this example also illustrates more details of accumulator unit 902, which is a more detailed example of accumulator unit 314 in FIG. 3.

Accumulator unit 902 includes tanks 904 and 906. These tanks may be used to provide gas that may be fed or pumped into accumulator tank 908. Accumulator unit 902 may provide a shock absorber for vertical support system 506. In these examples, pressure transducer 910 and pressure transducer 911 attached to accumulator tank 908 may provide feedback as to the amount of pressure present within tanks 904 and 906 in these examples.

As depicted, accumulator tank 908 contains hydraulic fluid in a chamber (not shown) over a piston (not shown) pressured by a gas located in tank 904 and tank 906. This gas may be, for example, without limitation, nitrogen or some other suitable gas. Accumulator unit 902 may provide a lifting force with constant pressure and vertical compliance, in these examples. In other words, accumulator unit 902 may act as a shock absorber. Accumulator unit 902 may react in response to vertical forces or loads applied to vertical support system 506.

Accumulator unit 902 may allow vertical movement during the opening, loading and unloading operations, and closing of a swing tail cargo door without requiring an operator to adjust the vertical force. Accumulator unit 902 may provide a passive system to maximize protection of the aircraft against undesired vertical forces being applied to the swing tail cargo door. Accumulator unit 902 may move several inches within a short period of time, without substantial changes in the interface load with swing tail cargo door 416.

Accumulator unit 902 may respond or react to vertical movement of swing tail cargo door 416 during opening, closing, and loading and unloading of cargo from swing tail aircraft 400. In other words, accumulator unit 902 provides a shock absorber or a passive spring support function. Valves may be present within accumulator unit 902 to regulate the flow, restrict lifting, and lowering based on operations being performed on the swing tail cargo door.

Figure 10:
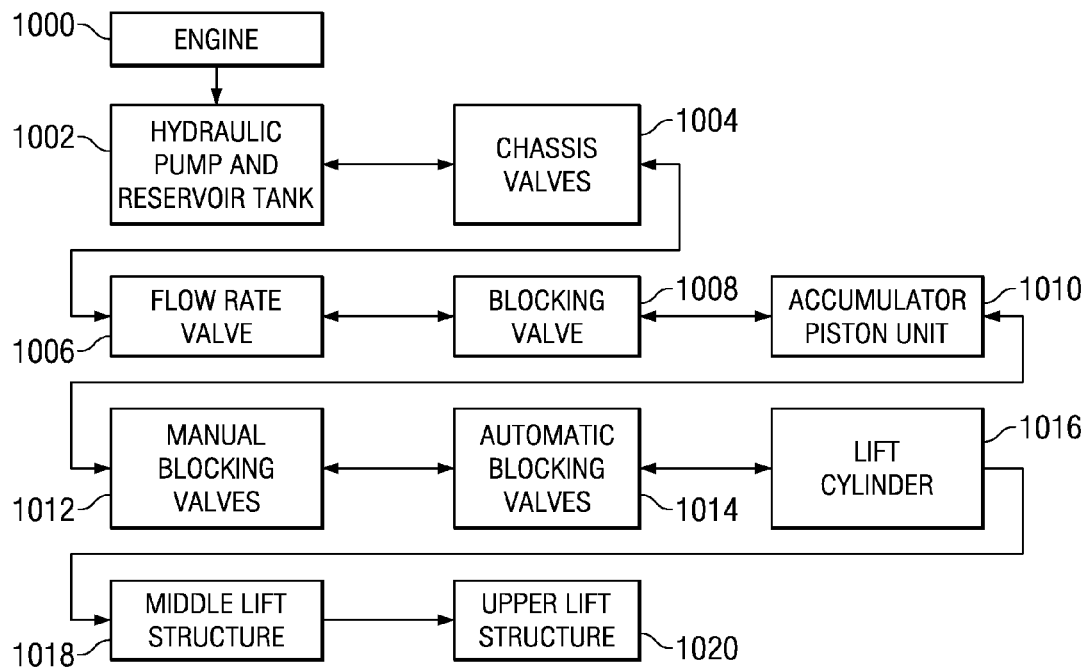
FIG. 10 is an illustration of components used in providing lift forces in a vertical support system in accordance with an advantageous embodiment.

In FIG. 10, an illustration of components used in providing lift forces in a vertical support system is depicted in accordance with an advantageous embodiment.

In these examples, mobile tail support apparatus 500 may include engine 1000, hydraulic pump and reservoir tank 1002, chassis valves 1004, flow rate valve 1006, blocking valve 1008, accumulator piston unit 1010, manual blocking valves 1012, automatic blocking valves 1014, lift cylinder 1016, middle lift structure 1018, and upper lift structure 1020.

The different components in this illustrative example may be implemented in mobile tail support apparatus 300 in FIG. 3 to provide lift forces within vertical support system 304 in FIG. 3. In this example, engine 1000 may provide electrical power to run hydraulic pump and reservoir tank 1002. Engine 1000 may be the engine for mobile support base 510.

Chassis valves 1004 may provide hydraulic fluid for generating lift forces within vertical support system 506. Chassis valves 1004 may be operated by an operator or user of mobile tail support apparatus 300 in these examples. Chassis valves 1004 also may provide a return for hydraulic fluid to hydraulic pump and reservoir tank 1002.

Flow rate valve 1006 may control the rate at which hydraulic fluid flows to and from chassis valve 1004 and blocking valve 1008. Flow rate valve 1006 may provide for fast or full open flow for filling an accumulator tank with hydraulic fluid. When the tank has been filled, flow rate valve 1006 may close partially or entirely at the working pressure desired for the accumulator tank. Blocking valve 1008 may prevent the flow of hydraulic fluids to the tanks and the accumulator unit unless the operator is lifting or moving middle lift structure 1018. Accumulator piston unit 1010 may be operated to allow full movement within a working pressure range within the accumulator unit. Manual blocking valves 1012 may be typically open, but may be closed for maintenance purposes.

Automatic blocking valves 1014 may provide non-mobile protection for unexpected forces. These values may be activated by the swing tail control system 310 when an imbalance or rapid change in pressure is detected, such as a rapid unexpected change in hydraulic pressure. Lift cylinder 1016 may be powered by hydraulic fluid flowing from the accumulator unit to provide lift to middle lift structure 1018. Upper lift structure 1020 may be raised and lowered by chains. In this example, the chains may be under tension with one end connected to the bottom lift structure, the other end connected to the upper lift structure, and routed over rollers in the middle section such that when the middle section is raised by hydraulic cylinders, the chains may pull up the upper lift structure.

Figure 11:
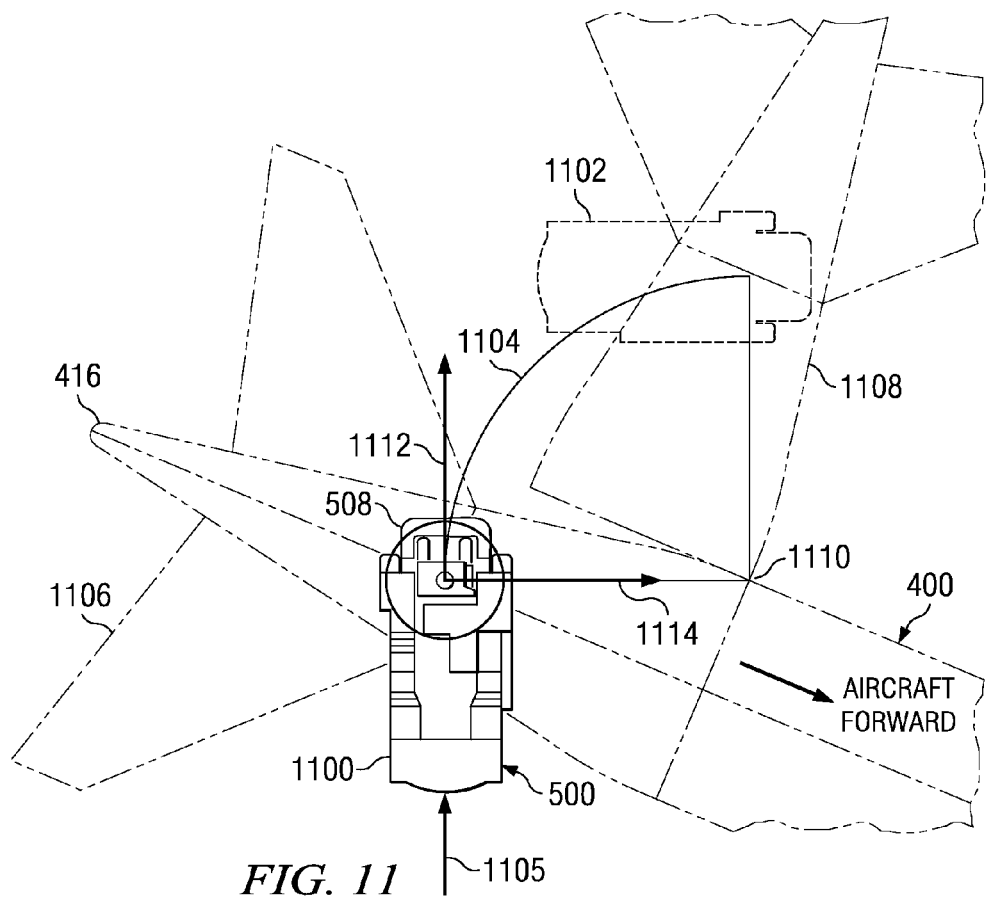
FIG. 11 is an illustration of a horizontal support system coupled to a swing tail cargo door in accordance with an advantageous embodiment.

Turning now to FIG. 11, an illustration of a horizontal support system coupled to a swing tail cargo door is depicted in accordance with an advantageous embodiment. In this example, horizontal support system 508 in mobile tail support apparatus 500 may engage swing tail cargo door 416 of aircraft 400 to move from position 1100 to position 1102 along arc 1104. Arrow 1105 may indicate a forward direction for mobile tail support apparatus 500. This movement moves swing tail cargo door 416 from position 1106 to position 1108 along hinge 1110. Rotational transducers may be located along hinge 1110 to provide an identification of the position of swing tail cargo door 416. This information may be transmitted to mobile tail support apparatus 500.

In this example, mobile tail support apparatus 500 may be pointed in a tangential direction as identified by arrow 1112. The tangential direction identified by arrow 1112 may be the direction that mobile tail support apparatus 500 travels when opening swingtail cargo door 416 in a drive mode. A radial direction may be identified by arrow 1114. The radial direction may be a direction perpendicular to the tangential direction and towards hinge 1110.

Horizontal support system 508 may provide an ability to prevent unacceptable loads from being introduced into hinge 1110 and/or swing tail cargo door 416 during operations in which swing tail cargo door 416 may be repositioned or moved. These unacceptable loads may occur due to any number of reasons including from operating swing tail cargo door 416, loading and unloading operations, or wind loading on swingtail cargo door 416 and/or aircraft 400.

Figure 12:
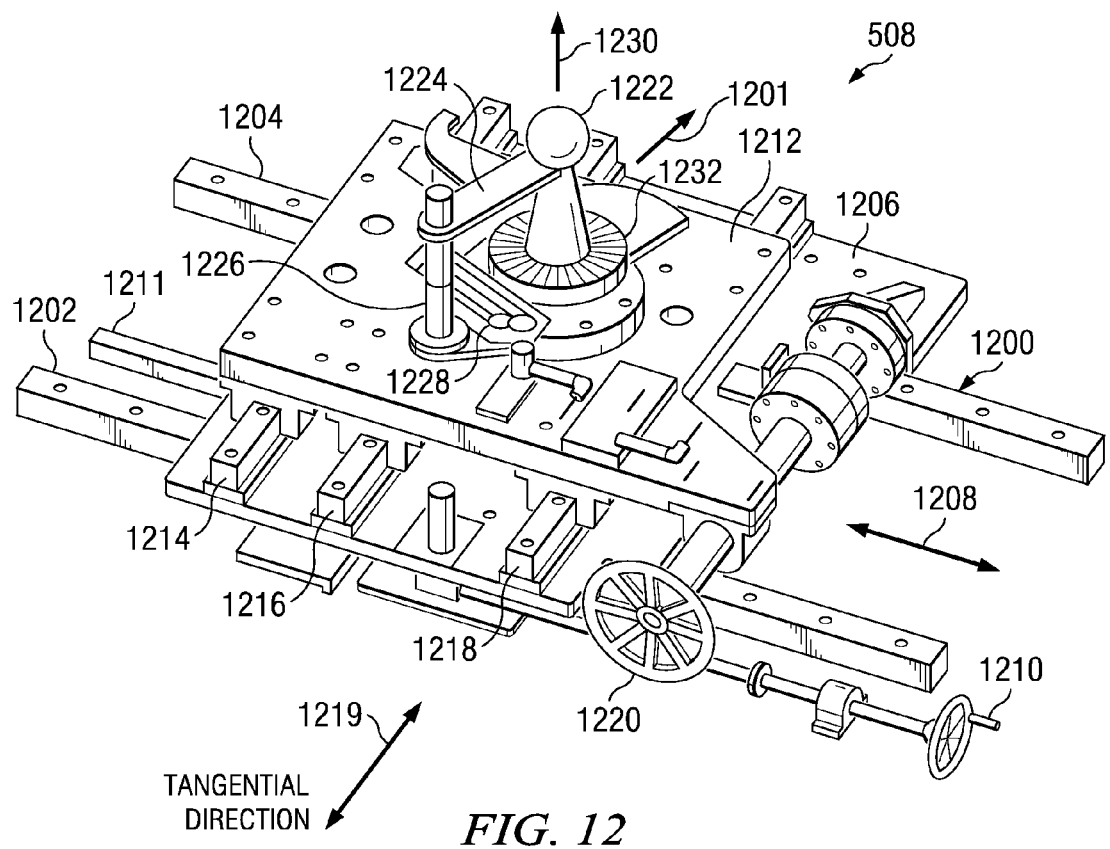
FIG. 12 is an illustration of a horizontal support system in accordance with an advantageous embodiment.

Turning now to FIG. 12, an illustration of a horizontal support system is depicted in accordance with an advantageous embodiment. In this example, horizontal support system 508 contains cross track slide system 1200. Arrow 1201 may indicated a forward direction of mobile tail support apparatus 500, which may correspond to the direction of mobile tail support apparatus 500 in FIG. 11 as indicated by arrow 1105.

Cross track slide system 1200 may include radial slide rails 1202 and 1204 on which radial platform 1206 may slide along the direction of arrow 1208. In these examples, radial platform 1206 and the different components attached to radial platform 1206 may remain at a "constant" distance from the centerline 1230 to centerline through hinge 1110 at all times after attachment and until detachment operations may be completed. The distance of mobile tail support apparatus 500 the centerline though hinge 1110 of swing tail cargo door 416 may vary.

Radial slide rails 1202 and 1204 allow radial platform 1206 freedom of movement in a radial direction along the direction of arrow 1208. This movement may prevent unacceptable loads from being applied to the swing tail cargo door. In these examples, sensor 1211 may identify the radial displacement or location of radial platform 1206 with respect to mobile tail support apparatus 500 during operations.

Further, the removal of tangential preload may be provided during detachment operations of the swing tail cargo door using tangential adjustment hand wheel 1220. This hand wheel and radial adjustment hand wheel 1210 may be used to provide tangential and radial adjustment for alignment purposes during attachment operations.

In these examples, tangential platform 1212 may slide on tangential slide rails 1214, 1216, and 1218 along the direction of arrow 1219. These rails may be mounted on radial platform 1206. These tangential slide rails may be mounted on radial platform 1206. Tangential platform 1212 may not have the freedom of movement during operation of mobile tail support apparatus 500. Instead, tangential platform 1212 may remain fixed in place in relation to the radial platform 1206 during most operations. Tangential platform 1212 may be moved for alignment and detachment purposes using tangential hand wheel 1220.

In this example, ball fitting 1222 may be an example of a coupling mechanism, such as coupling mechanism 308 in FIG. 3. Ball fitting 1222 may couple or engage the swing tail cargo door at a socket, such as for example, without limitation, socket 504 in FIG. 5. Ball fitting 1222 may be mounted on and fixed in place on tangential platform 1212. Ball fitting 1222 may be mounted permanently to tangential platform 1222.

Under normal operations, ball fitting 1222 may provide an upward force into socket 504. The upward force may be produced by hydraulic pressure generated by mobile tail support apparatus 500 and by resistance to this pressure from swing tail cargo door 416. Lock plate 1224 may provide an additional mechanism to ensure that ball fitting 1222 remains engaged or coupled to socket 504 of swing tail cargo door 416 to prevent free movement of the swing tail cargo door relative to ball fitting 1222. An example of a situation in which the coupling of ball fitting 1222 may remain in place with swing tail cargo door 416 may be a hydraulic failure in the mobile tail support apparatus.

Chassis angle index pin 1226 may be attached to angular measurement bracket 1228. Angular measurement bracket 1228 may rotate around centerline 1230 for ball fitting 1222. Chassis angle index pin 1226 may be used to identify an angular relationship of the mobile tail support apparatus with respect to swing tail cargo door 416 around hinge 1110.

The ability of horizontal support system 508 to move along radial direction 1208 may prevent undesired radial loads from being introduced onto swing tail cargo door 416 and/or the hinge of the swing tail cargo door from mobile tail support apparatus 500. Chassis angle rotary sensor 1232 may identify the rotation of swing tail cargo door 416 about ball fitting 1222 with respect to mobile tail support apparatus 500.

In these examples, mobile tail support apparatus 500 may move in a radial direction a predetermined distance from the centerline of the ball fitting 1222 along radial direction 1208. This predetermined distance may provide a range of movement to allow the mobile tail support apparatus 500 to be driven along an arc during opening and closing operations without imposing undesired radial loads on swing tail cargo door 416 and/or hinge 1110. For example, without limitation, if the mobile tail support apparatus 500 drives a few inches off an ideal arc path, ball fitting 1222 may move, in relation to the mobile tails support apparatus 500 in a radial direction an equivalent amount while maintaining interface loads in the vertical and tangential directions.

Horizontal support system 508 may provide a tangential compliance feature to align ball fitting 1222 with socket 504 on swing tail cargo door 416 when coupling ball fitting 1222 to swing tail cargo door 416. This feature also allows for removal of tangential preload during detachment operations.

The angular value, the radial displacement from the mobile tail support apparatus 500 centerline to the centerline of the ball fitting, and the current steering angle of the wheels for the mobile tail support apparatus may be used to determine guidance or changes in movement of the mobile tail support apparatus 500 to minimize or reduce undesired forces on swing tail cargo door 416 during repositioning or movement of swing tail cargo door 416.

The angular value may be, for example, without limitation, the angle of mobile tail support apparatus 500 relative to swing tail cargo door 416. The radial displacement may be a change in the distance of an attachment point of mobile tail support apparatus 500 from an axis of rotation of swing tail cargo door 416. The axis of rotation may be, for example, without limitation, hinge 1110.

Figure 13:
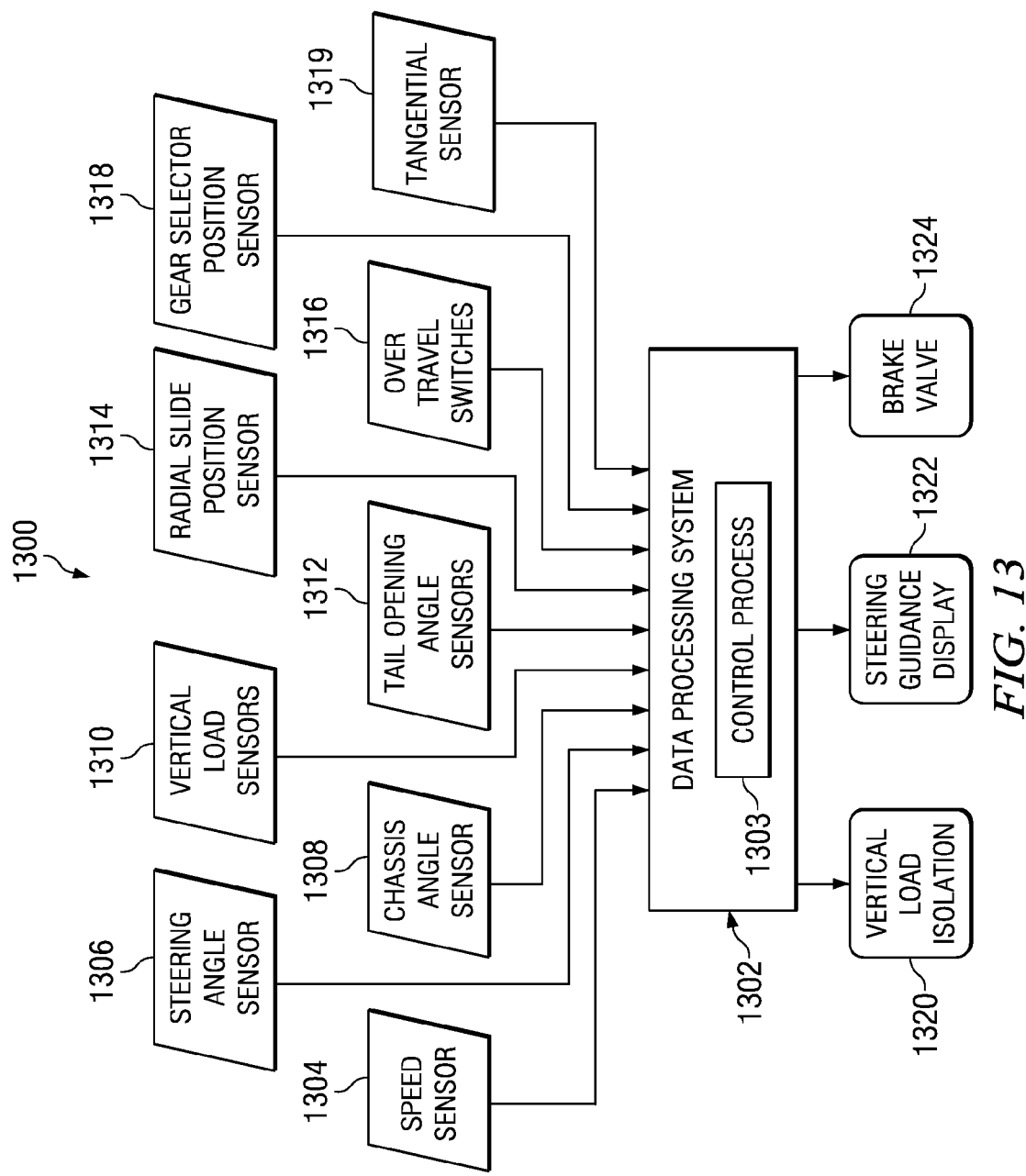
FIG. 13 is an illustration of a swing tail control system in accordance with an advantageous embodiment.

Turning now to FIG. 13, an illustration of a swing tail control system is depicted in accordance with an advantageous embodiment. In this example, swing tail control system 1300 is an example of one implementation Swing tail control system 310 in FIG. 3. Swing tail control system 1300 may include data processing system 1302 which receives input from sensors. Control process 1303 takes the form of a computer program that executes on data processing system 1302 to manage movement of mobile tail support apparatus 300 in response to receiving input from the sensors.

These sensors include, for example, without limitation, speed sensor 1304, steering angle sensor 1306, chassis angle sensor 1308, vertical load sensors 1310, tail opening angle sensors 1312, radial slide position sensor 1314, over travel switches 1316, gear selector position sensor 1318, and tangential sensor 1319. In response to these inputs, control process 1303 may generate guidance in the form of outputs to lift vertical load isolation 1320, steering guidance display 1322, and brake valve 1324.

Speed sensor 1304 may provide information about the speed at which the mobile tail support apparatus may be traveling. Steering angle sensor 1306 may identify the angle at which a wheel is turned on the mobile tail support apparatus. Chassis angle sensor 1308 may detect the angle of a centerline of the chassis with respect to a line for a radial distance to the hinge of the swing tail cargo door. More specifically, chassis angle sensor 1314 may be an example of angle sensor 332 in FIG. 3. This sensor may be, for example, without limitation, chassis angle rotary sensor 1232 in FIG. 12 or some other suitable sensor.

Vertical load sensors 1310 may provide information about the loading on the vertical support system. Vertical load sensors 1310 may be examples of vertical load sensor 326 in FIG. 3. More specifically, vertical load sensors 1310 may be, for example, without limitation, implemented using load cell sensor 900. In these examples, a load cell sensor may be used with each lift chain in FIG. 9 or some other suitable sensor. Tail opening angle sensors 1312 may provide information about the position of swing tail cargo door 416 with respect to the rest of swing tail aircraft 400. These sensors may be located along or in hinge 1110 of the swing tail cargo door 416.

Radial slide position sensor 1314 may provide information about the radial displacement of mobile tail support apparatus 500 with respect to an ideal arc along which mobile tail support apparatus 500 may travel. An ideal arc corresponds to the path the ball fitting centerline 1230 makes in a horizontal plane as swingtail rotates about hinge 1110. This radial displacement may be a selected distance plus or minus a value with respect to the desired radial distance from hinge 1110 of swing tail cargo door 416. Radial slide position sensor 1314 may be implemented using radial travel linear sensor 1211 in FIG. 12.

Over travel switches 1316, located near the ends of radial sensor 1211, may provide an indication of radial travel beyond an allowed and/or desired distance. Gear selector position sensor 1318 may provide an identification of the direction traveled by mobile tail support apparatus 500.

Tangential sensor 1319 may provide information about the amount of rotational force that may be imparted on swing tail aircraft 400 at ball fitting 1222. Tangential sensor 1319 sensor may be used to allow the operator to know when the preload is at a low enough level to safely decouple mobile tail support apparatus 500 from swing tail aircraft 400. Tangential sensor 1319 also may be used to automatically engage brake system 339 if loads on swing tail aircraft 400 exceed preset parameters in either the forward or reverse directions for movement of mobile tail support apparatus 500.

Vertical load isolation 1320 may be an output that provides an adjustment to the amount of pressure or position of the vertical support system. Vertical load isolation 1320 may provide information or signals to control various valves and pumps for the vertical support system. For example, to increase the vertical load the blocking valve 1008 may be opened and hydraulic pump 1002 may be run to increase hydraulic pressure in the vertical support system 304.

Steering guidance display 1322 may provide steering signals to an operator of the mobile tail support apparatus. In other words, the steering signals may provide steering guidance to an operator on a display. These steering signals may provide an indication of the changes in the direction of travel for the mobile tail support apparatus that may be needed to minimize or reduce undesirable forces on the swing tail cargo door.

Brake valve 1324 may be controlled by data processing system 1302 to halt movement of mobile tail support apparatus 500. Halting of mobile tail support apparatus 500 may occur if mobile tail support apparatus 500 has traveled beyond some distance or has caused an undesirable load to occur on swing tail cargo door 416.

Figure 14:
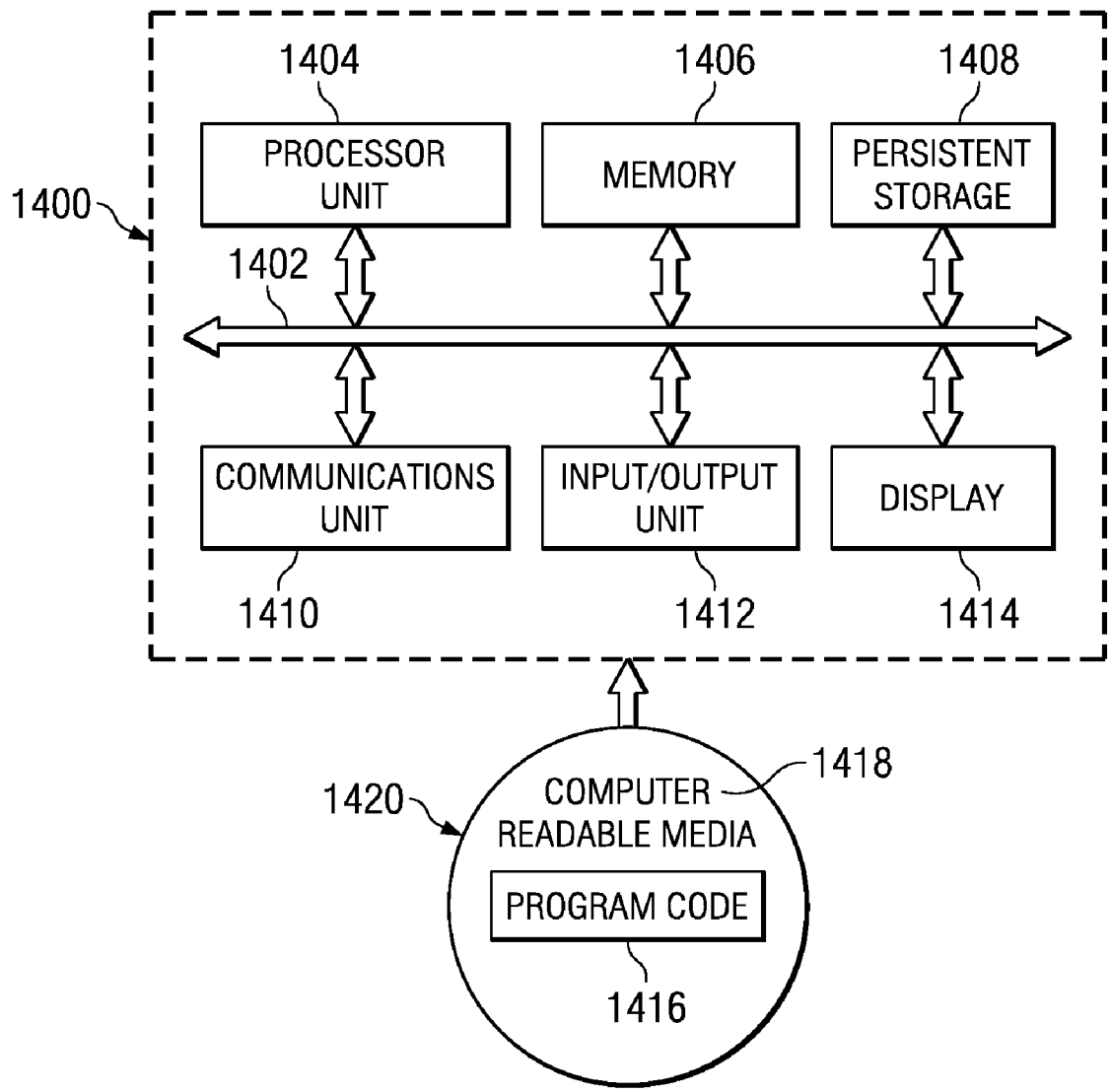
FIG. 14 is an illustration of a data processing system in accordance with an advantageous embodiment.

Turning now to FIG. 14, a diagram of a data processing system is depicted in accordance with an advantageous embodiment. Data processing system 1400 is an example of one implementation for data processing system 1302 in FIG. 13. In this illustrative example, data processing system 1400 includes communications fabric 1402, which provides communications between processor unit 1404, memory 1406, persistent storage 1408, communications unit 1410, input/output (I/O) unit 1412, and display 1414.

Processor unit 1404 serves to execute instructions for software that may be loaded into memory 1406. Processor unit 1404 may be a set of one or more processors or may be a multi-processor core, depending on the particular implementation. Further, processor unit 1404 may be implemented using one or more heterogeneous processor systems in which a main processor may be present with secondary processors on a single chip. As another illustrative example, processor unit 1404 may be a symmetric multi-processor system containing multiple processors of the same type.

Memory 1406, in these examples, may be, for example, a random access memory or any other suitable volatile or non-volatile storage device. Persistent storage 1408 may take various forms depending on the particular implementation. For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 may be for example, without limitation, a network interface card or some other suitable device. Communications unit 1410 may provide communications through the use of either or both physical and wireless communications links.

Input/output unit 1412 allows for input and output of data with other devices that may be connected to data processing system 1400. For example, input/output unit 1412 may provide a connection for user input through a keyboard and mouse or other suitable means. Further, input/output unit 1412 may send output to a printer or other suitable output device. Display 1414 provides a mechanism to display information to a user.

Instructions for the operating system and applications or programs may be located on persistent storage 1408. These instructions may be loaded into memory 1406 for execution by processor unit 1404. The processes of the different embodiments may be performed by processor unit 1404 using computer implemented instructions, which may be located in a memory, such as memory 1406. These instructions may be referred to as program code, computer usable program code, or computer readable program code that may be read and executed by a processor in processor unit 1404. The program code in the different embodiments may be embodied on different physical or tangible computer readable media, such as memory 1406 or persistent storage 1408.

Program code 1416 may be located in a functional form on computer readable media 1418 that may be selectively removable and may be loaded onto or transferred to data processing system 1400 for execution by processor unit 1404. Program code 1416 and computer readable media 1418 form computer program product 1420 in these examples. In one example, computer readable media 1418 may be in a tangible form, such as, for example, without limitation an optical disc, magnetic disc, or some other suitable media that may be inserted or placed into a drive or other device that may be part of persistent storage 1408 for transfer onto a storage device. The storage device may be, for example, without limitation, a hard drive that is part of persistent storage 1408 or some other suitable device. In a tangible form, computer readable media 1418 also may take the form of a persistent storage, such as without limitation a hard drive, a thumb drive, or a flash memory that may be connected to data processing system 1400. The tangible form of computer readable media 1418 may also be referred to as computer recordable storage media. In some instances, computer readable media 1418 may not be removable.

Alternatively, program code 1416 may be transferred to data processing system 1400 from computer readable media 1418 through a communications link to communications unit 1410 and/or through a connection to input/output unit 1412. The communications link and/or the connection may be physical or wireless in the illustrative examples. The computer readable media also may take the form of non-tangible media, such as communications links or wireless transmissions containing the program code.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown.

As one example, a storage device in data processing system 1400 may be any hardware apparatus that stores data.

Memory 1406, persistent storage 1408 and computer readable media 1418 may be non-limiting examples of storage devices in a tangible form.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as, for example, without limitation, a modem, a network adapter, or some other suitable device. Further, a memory may be, for example, without limitation, memory 1406, a cache such as found in an interface and memory controller hub that may be present in communications fabric 1402, or some other suitable device.

Figure 15:
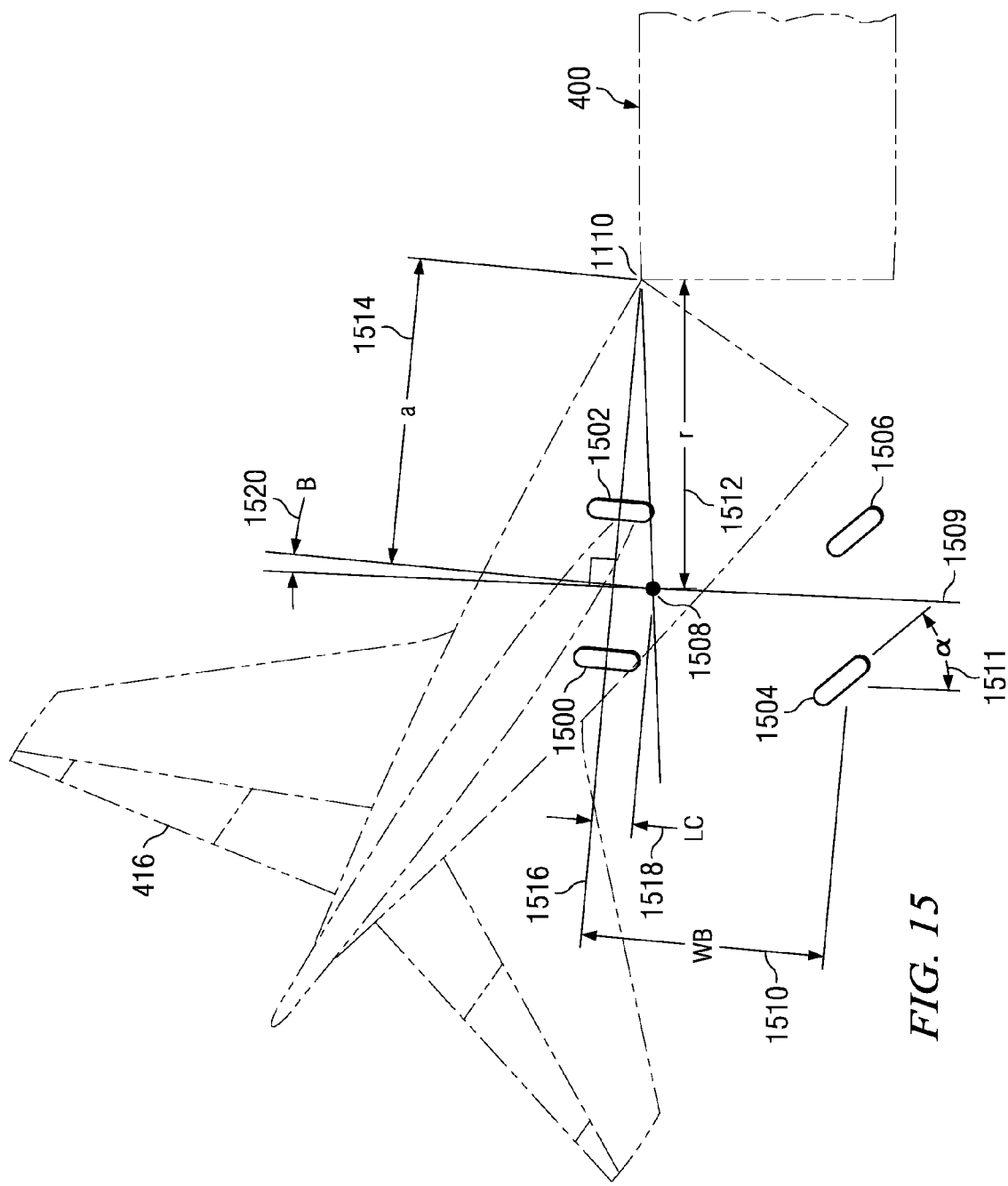
FIG. 15 is an illustration of geometries and parameters for controlling a mobile tail support apparatus in accordance with an advantageous embodiment.

With reference next to FIG. 15, an illustration of geometries and parameters for controlling a mobile tail support apparatus is depicted in accordance with an advantageous embodiment. In this example, tire locations 1500, 1502, 1504, and 1506 may identify the locations of tires for mobile tail support apparatus 500. Attachment point 1508 check/verify identifies the location at which ball fitting 1222 couples to swing tail cargo door 416.

Centerline 1509 may identify the centerline of the mobile support base for the mobile support apparatus. Steering angle α 1511 may identify the angle of the steering wheel for the mobile support apparatus. This angle may be shown as an actual angle and/or a theoretical angle in the different embodiments. The actual angle at which tire 1504 may be turned with respect to centerline 1508 may be shown for steering angle α 1511. The theoretical angle α may be the angle at which tire 1504 should be turned relative to centerline 1508. In these examples, wheel 1506 may be rotated at same angle α as wheel 1504.

Wheel base (WB) 1510 may be the wheel base of the mobile tail support 500. Wheel base 1510 may identify the distance between the axle for wheels 1500 and 1502 and wheels 1504 and 1506. Coupling radius 1512 may be the distance from hinge 1110 and attachment point 1508. Radius a 1514 may be the distance from hinge 1110 to the front axle of mobile tail support apparatus 500 along line 1516 for wheels 1500 and 1502. In these examples, this radius may be calculated as follows:

$$\sqrt{r^2 - LC^2}$$

Distance LC 1518 may be the distance along centerline 1508 from the axle to the center of the ball fitting. Angle β 1520 may be the angle of the chassis for the mobile tail support apparatus relative to the hinge radius as identified by coupling radius r 1512. The displacement of horizontal support system 508 for ball fitting 1222 may be the radial displacement d, in these examples.

In the depicted examples, wheel base 1510 may be, for example, without limitation, around 225 inches. Coupling radius 1512 may be, for example, without limitation, around 410 inches. Distance LC 1518 may be, for example, without limitation, 10.5 inches.

In these examples, the theoretical steering angle α 1511 is needed to remain within the desired arc of travel may be calculated as follows:

$$\alpha = \tan^{-1}\left(\frac{WB}{a}\right)$$

In the advantageous embodiments, two variables may be present in swing tail control system 310. These variables may be, for example, without limitation, the radial displacement d and chassis angle β 1520.

Changes in the radial displacement may change the value of radius a 1514. This change may affect theoretical steering angles needed to guide mobile tail support apparatus 500 along the desired arc. Changes in chassis angle β 1520 may occur directly proportional to steering angle α 1511 as calculated above.

In the different advantageous embodiments, any displacement on the radial slide rail as identified by radial displacement d may make a change in radius a 1514 as follows:

$$a_c = \sqrt{r^2 - LC^2} + (K1 * d)$$

$a_c$ may be the corrected radius, d may be the radial displacement, and K1 may be a gain factor for radial displacement.

In the different advantageous embodiments, since the chassis angle may have a direct relationship with the steering angle, a referenced steering angle may be selected as follows:

$$\alpha_F = \tan^{-1}\left(\frac{WB}{a_c}\right) + (K2 * \beta)$$

$$\alpha_R = \tan^{-1}\left(\frac{WB}{a_c}\right) - (K2 * \beta)$$

$\alpha_F$ may be the steering reference angle for the forward motion, $\alpha_R$ may be the reference steering angle for the reverse motion, and K2 may be a gain factor for the chassis angle.

In the different advantageous embodiments, the constants for gains K1 and K2 may be identified through various trials and experiments to obtain empirical data. These gains may be selected to provide a least radial error while providing adequate stability. Changes to these values may change because of the changes in the tires or weight of mobile tail support apparatus 500. The referenced steering angles, $\alpha_F$ and $\alpha_R$, may be continuously computed for forward and reverse movements of mobile tail support apparatus 500 based on the position of the gear shift for the mobile tail support apparatus 500. This angle may then be compared to the actual steering angle of the chassis and the difference may be graphically displayed.

In this manner, an operator may provide guidance to correct or alter the steering of mobile tail support apparatus 500 to minimize the difference that may be present. Alternatively, an automatic steering system may be employed to automatically change the direction of mobile tail support apparatus 500.

In addition to monitoring the movement of mobile tail support apparatus 500 and providing guidance, data processing system 1302 also may monitor the angle of swing tail cargo door 416 from sensors in hinge 1110 and the radial displacement of the mobile tail support apparatus 500 from hinge 1110 to determine if or whether movement of the mobile tail support apparatus 500 should stop. A threshold value and/or distance may be used to cause sending of a signal to brake system 339 of mobile tail support apparatus 500 to stop mobile tail support apparatus 500 in order to prevent movement of mobile tail support apparatus 500 outside of some boundary or distance.

Once applied, the brake system 339 may be overridden by supplying a password to control system 310 in these examples. The activation of the brake system 339 may be initiated through a solenoid driven hydraulic valve that supplies brake pressure, bypassing the normal input generated by an operator. Further, vertical load sensors and lift truck speed sensors also may be used to activate brake system 339 if any of the parameters monitored by the sensors move outside of some threshold.

Figure 16:
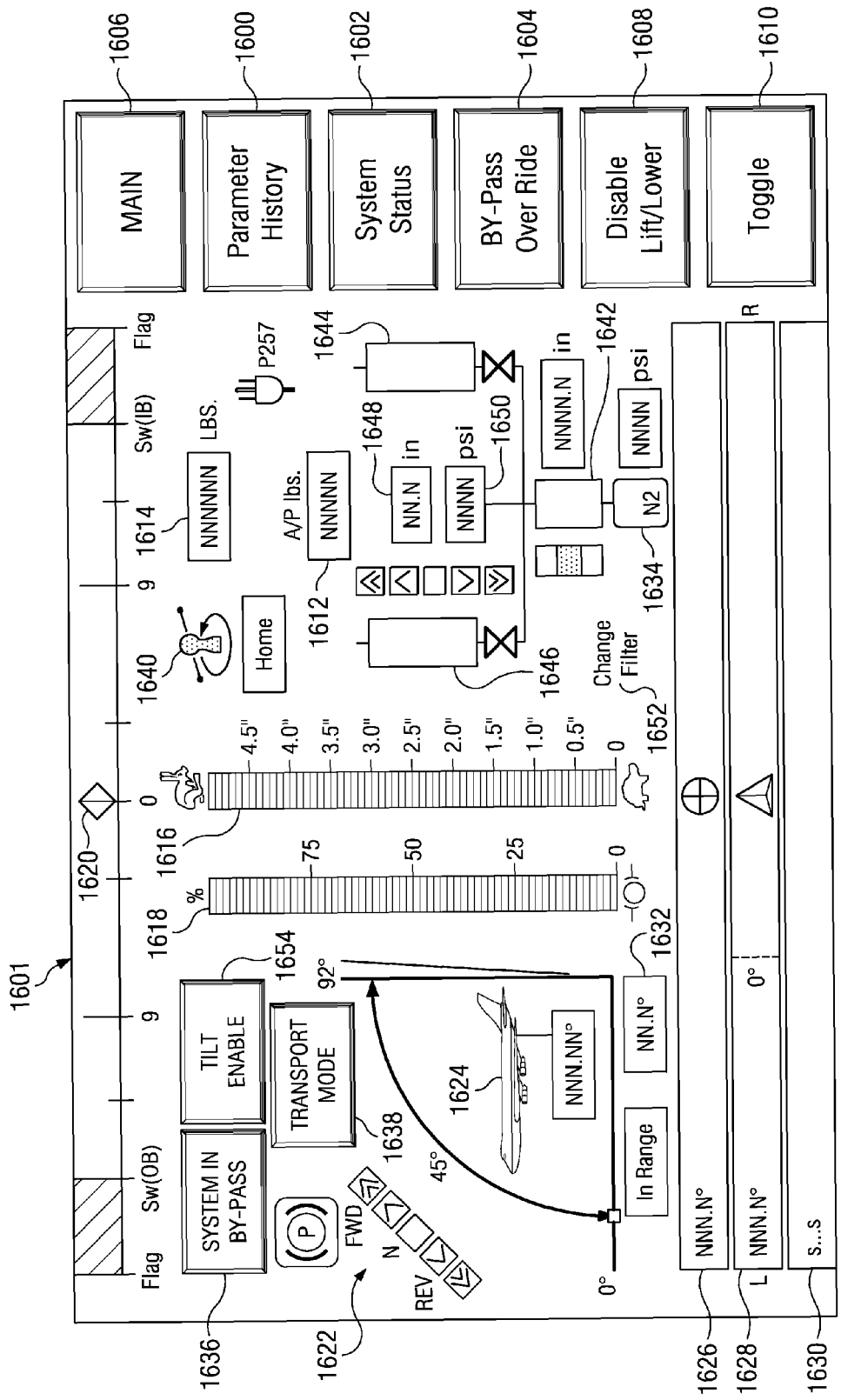
FIG. 16 is an illustration of a steering guidance display in accordance with an advantageous embodiment.

With reference now to FIG. 16, an illustration of a steering guidance display is depicted in accordance with an advantageous embodiment. In this example, display 1601 may be an example of a display presented to an operator of mobile tail support apparatus 500 to guide the operator in steering and controlling movement of mobile tail support apparatus 500. Display 1601 may be an example of steering guidance display 1322 in FIG. 13. Buttons 1600, 1602, and 1604 may be touch screen buttons that may provide information, such as, for example, without limitation, parameter history, system status, by-pass override controls and/or other suitable information.

Main button 1606 may return display 1322 to the main display screen as presented in this example. Button 1608 may be used to enable and disable the lower lift structure in the mobile tail support apparatus 500. Button 1610 may allow a user to toggle between the main screen as shown and a screen displaying information about hydraulics, radial travel, arc movement of the mobile tail support apparatus 500 and/or other suitable information. Aircraft load feedback indicator 1612 displays the net weight of swing tail cargo door 416. Tangential load feedback indicator 1614, may identify the tangential load on the swing tail cargo door.

Graphical bar 1616 identifies the current speed of mobile tail support apparatus 500. Graphical bar 1618 identifies the brake pressure being applied to mobile tail support apparatus 500.

Radial displacement indicator 1620 may identify the radial displacement of mobile tail support apparatus 500 from the nominal value of coupling radius 1512 when engaged to swing tail cargo door 416. In its current position, radial displacement indicator 1620 may indicate that mobile tail support apparatus 500 is within the radial displacement. Movement of this indicator to the left or right may indicate that mobile tail support apparatus 500 has shifted radially with respect to the horizontal support system because of movement of mobile tail support apparatus 500 away from the desired ideal arc value of coupling radius 1512.

Gear indicator 1622 may indicate whether mobile tail support apparatus 500 may be in reverse, neutral, or forward. Angle indicator 1624 identifies the angle of mobile support base 302 with respect to the chassis angle of swing tail aircraft 400.

Theoretical steering angle 1626 identifies the desired steering angle for mobile tail support apparatus 500. Actual steering angle 1628 identifies the actual steering angle of mobile tail support apparatus 500.

Message line display 1630 may be used to display messages to an operator. Swing tail opening angle 1632 identifies the angle of swing tail aircraft 400 with respect to the rest of the aircraft. Nitrogen indicator 1634 identifies the amount of nitrogen that may be present in the different nitrogen tanks in mobile tail support apparatus 500. By-pass mode indicator 1636 indicates whether mobile tail support apparatus 500 may be operating in a by-pass mode.

A by-pass mode may be activated when by-pass over ride functions associated with button 1604 are used to turn off the feedback of one or more sensors used as an input for data processing system 1302. For example, if radial slide position sensor 1314 is by-passed, then data processing system 1302 may not engage brake valve 1324 even if the radial slide position sensor is activated, thereby allowing operation to correct the condition that caused mobile tail support apparatus 500 to cease movement.

Transport mode indicator 1638 may be used to indicate that mobile tail support apparatus 500 may be operated at high speeds such as when the mobile tail support apparatus 500 is moving from it's storage location to and/or from swing tail aircraft 400. Chassis angle rotary sensor home indicator 1640 identifies that controls 1303 have received signals from rotary sensor 1232 to lock in accurate angle readings. Accumulator piston indicator 1642 may be used to identify the position of the piston in the accumulator unit. Cell feedback indicators 1644 and 1646 may be used to provide a graphical representation of the load or pressure displayed in aircraft load feedback indicator 1612 and hydraulic pressure reading 1650.

Cylinder stroke feedback indicator 1648 may be used to identify the extension or height of vertical support system 506. Hydraulic pressure reading 1650 may provide identification of the hydraulic pressure within mobile tail support apparatus 500. Change filter indicator 1652 may indicate when a filter for the hydraulic system should be changed. Tilt enable button 1654 may allow vertical support system 506 to tilt or be angled rearward or forward with respect to mobile tail support apparatus 500. In these examples, the tilt may be, for example, without limitation, around two degrees, zero degrees, and/or or some other suitable angle.

Display 1601 is presented as one example of a display that may be used to provide guidance in operating mobile tail support apparatus 500. This particular example is not meant to limit the manner in which guidance for managing movement of mobile tail support apparatus 500 may be presented.

In other implementations, for example, without limitation, a path or arc with a mobile tail support apparatus 500 or other suitable information may be displayed. In this type of presentation, the angle of the wheels may be displayed with the actual position of the wheels and the desired position of the wheels. As the user changes the position of the wheels through the steering wheel, the actual position displayed may change. When the angle for the actual steering of the wheels matches the theoretical angle, then the actual wheels may overlap the theoretical wheels in the display. Further, other information, such as, for example, without limitation, as the values for the actual and theoretical steering angles also may be presented.

Figure 17:
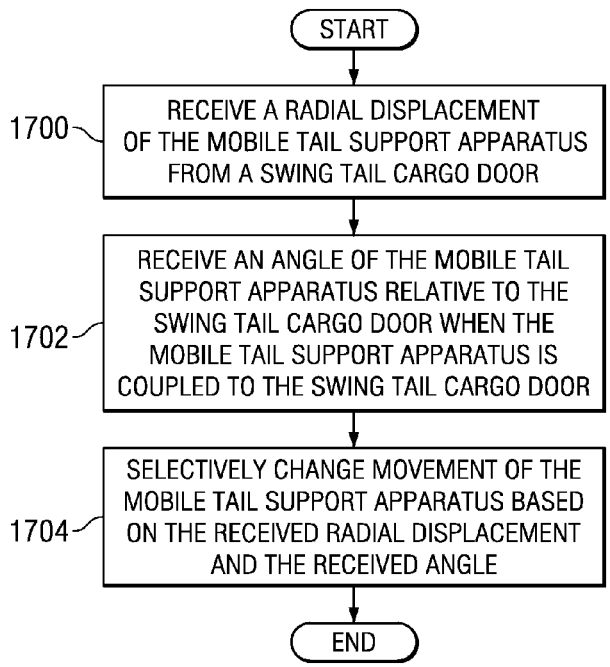
FIG. 17 is a flowchart of a process for managing movement of a mobile tail support apparatus in accordance with an advantageous embodiment.

Turning now to FIG. 17, a flowchart of a process for managing movement of a mobile tail support apparatus is depicted in accordance with an advantageous embodiment. This flowchart is a high level flowchart of a process that may be implemented in a mobile tail support apparatus 500, such as mobile tail support apparatus 300 in FIG. 3. In particular, the different processes may be implemented in a data processing system, such as data processing system 1400 in FIG. 14 as part of swing tail control system 310 in FIG. 3.

The process begins with a known radial displacement value for the mobile tail support apparatus 500 from swing tail cargo door 416 (operation 1700). This radius may be coupling radius 1512 which may be a distance from a point at which the ball fitting 1222 on mobile tail support apparatus 500 may be coupled to swing tail cargo door 416 to hinge 1110 of swing tail cargo door 416. Thereafter, an angle of mobile tail support apparatus 500 relative to swing tail cargo door 416 may be received with mobile support tail apparatus 500 coupled to swing tail cargo door 416 (operation 1702).

Thereafter, the process may selectively change movement of the mobile tail support apparatus 500 based on the received radial displacement from the nominal coupling radius and the received angle (operation 1704) with the process terminating thereafter.

The selective change in movement may be to provide steering signals to change the direction at which mobile tail support apparatus 500 may be traveling. The selective change also may be to halt mobile tail support apparatus 500 by applying braking if mobile tail support apparatus 500 has exceeded some threshold radial displacement distance from the nominal/desired value for the radial displacement. This distance may be the amount of travel that may occur along horizontal support system 508. In particular, if radial platform 1206 moves along radial slide rails 1202 and 1204 in relation to centerline 1509 of mobile tail support apparatus 500 more than a predetermined distance, brake system 339 may be applied to mobile tail support apparatus 500 to prevent undesired forces from being applied to swing tail cargo door 416.

Figure 18:
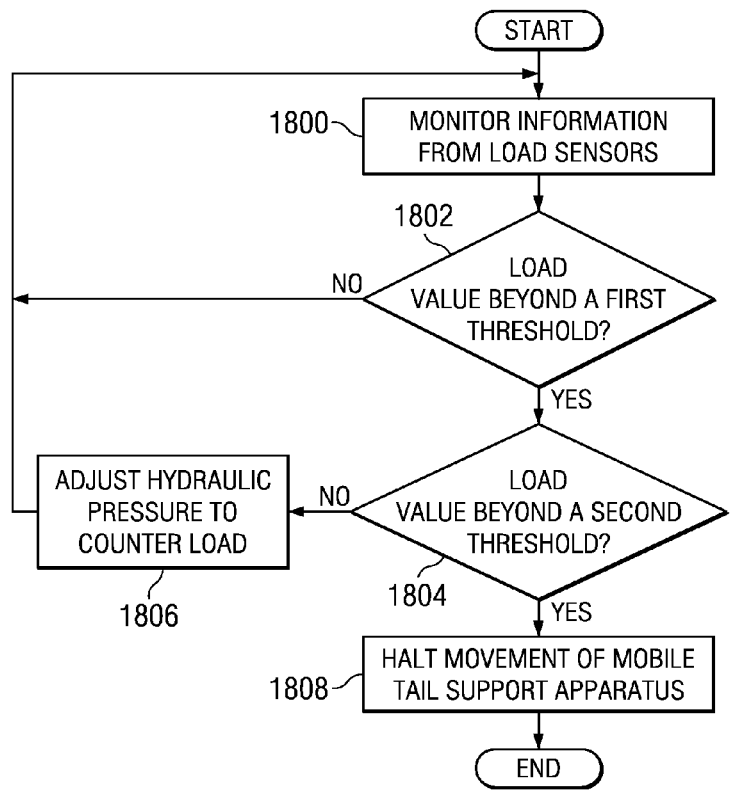
FIG. 18 is a flowchart of a process for monitoring loads on a mobile tail support apparatus in accordance with an advantageous embodiment.

Turning now to FIG. 18, a flowchart of a process for monitoring loads on a mobile tail support apparatus is depicted in accordance with an advantageous embodiment. The process in FIG. 18 may be implemented in a process, such as data processing system 1302 in FIG. 13.

The process begins by monitoring information from different load sensors (operation 1800). Thereafter, a determination may be made as to whether a load value may be beyond a first threshold (operation 1802). If the load value is not beyond the first threshold for the different load sensors, the process returns to operation 1800. Otherwise, a determination may be made as to whether the load value may be beyond a second threshold (operation 1804).

If the load value is not beyond a second threshold, hydraulic pressure may be adjusted to counter or react to the load (operation 1806) with the process then returning to operation 1800.

If the load value is beyond a second threshold, the process may then halt movement of the mobile tail support apparatus 500 (operation 1808) with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the different advantageous embodiments has been presented for purposes of illustration and description, and is not intended to be exhaustive or limited to the embodiments in the form disclosed. Many modifications and variations will be apparent to those of ordinary skill in the art. Further, the different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for moving a swing tail cargo door on a swing tail aircraft, the method comprising:

engaging a mobile tail support apparatus to the swing tail cargo door on the swing tail aircraft by coupling a ball fitting in the mobile tail support apparatus to the swing tail cargo door and locking the ball fitting to the swing tail cargo door in a coupled position, wherein the mobile tail support apparatus is a separate vehicle from the swing tail aircraft;

moving the swing tail cargo door from a first position to a second position using the mobile tail support apparatus;

reacting vertically to vertical loads on the swing tail cargo door during movement of the swing tail aircraft using a support system capable of controlling a vertical load of the swing tail cargo door of the swing tail aircraft during the movement of the swing tail cargo door; and reducing loads on a hinge of the swing tail cargo door during the movement of the swing tail cargo door using a second support system capable of isolating motions of the swing tail cargo door to prevent the unacceptable load from occurring on the swing tail or hinge of the swing tail cargo door during the movement of the swing tail cargo door around the axis through the hinge of the swing tail cargo door.

2. A method for moving a swing tail cargo door on a swing tail aircraft, the method comprising:

engaging a mobile tail support apparatus to the swing tail cargo door on the swing tail cargo door on the swing tail aircraft, wherein the mobile tail support apparatus is a separate vehicle from the swing tail aircraft; moving the swing tail cargo door from a first position to a second position using the mobile tail support apparatus;

reacting vertically to vertical loads on the swing tail cargo door during movement of the swing tail aircraft; and reducing loads on a hinge of the swing tail cargo door during the movement of the swing tail cargo door.

3. The method of claim 2, wherein the engaging step comprises:

coupling a ball fitting in the mobile tail support apparatus to the swing tail cargo door.

4. The method of claim 3, wherein the engaging step further comprising:

locking the ball fitting to the swing tail cargo door in a coupled position.

5. The method of claim 2, wherein the reacting step comprises:

reacting vertically to the vertical loads on the swing tail cargo door using a support system capable of controlling a vertical load of the swing tail cargo door of the swing tail aircraft during the movement of the swing tail cargo door.

6. The method of claim 5, wherein the support system is a first support system and wherein the reducing step comprises:

reducing the loads on a swing tail aircraft and the hinge of the swing tail cargo door during the movement of the swing tail cargo door using a second support system capable of isolating motions of the swing tail cargo door to prevent an unacceptable load from occurring on the swing tail or hinge of the swing tail cargo door during the movement of the swing tail cargo door around an axis through the hinge of the swing tail cargo door.

7. The method of claim 2, wherein moving the swing tail cargo door from the first position to the second position using the mobile tail support apparatus further comprises:

monitoring information from a number of load sensors associated with the mobile tail support apparatus.

8. The method of claim 7 further comprising:

determining whether a load value is beyond a first threshold using the information from the number of load sensors associated with the mobile tail support apparatus; and responsive to a determination that the load value is beyond the first threshold, determining whether the load value is beyond a second threshold using the information from the number of load sensors associated with the mobile tail support apparatus.

9. The method of claim 8 further comprising:

responsive to a determination that the load value is not beyond the second threshold, adjusting hydraulic pressure for the mobile tail support apparatus using a swing tail control system of the mobile tail support apparatus.

10. The method of claim 8 further comprising:

responsive to a determination that the load value is beyond the second threshold, halting movement of the mobile tail support apparatus using a swing tail control system of the mobile tail support apparatus.

* * * * *